United States Patent
Sagonas et al.

(10) Patent No.: US 11,657,631 B2
(45) Date of Patent: May 23, 2023

(54) SCALABLE, FLEXIBLE AND ROBUST TEMPLATE-BASED DATA EXTRACTION PIPELINE

(71) Applicant: ONFIDO LTD, London (GB)

(72) Inventors: Christos Sagonas, London (GB); Karolina Dabkowska, London (GB); Zhiyuan Shi, London (GB); Edward Fieri Soler, London (GB); Mohan Mahadevan, London (GB); Iona Grace Vincent, London (GB); Luca Peric, London (GB); Alessandro Lenzi, London (GB); Alvaro Fernando Lara, London (GB); James Stonehill, London (GB)

(73) Assignee: Onfido Ltd., London (GB)

(*) Notice: Subject to any disclaimer, the term of this patent is extended or adjusted under 35 U.S.C. 154(b) by 199 days.

(21) Appl. No.: 17/243,467

(22) Filed: Apr. 28, 2021

(65) Prior Publication Data
US 2021/0343030 A1 Nov. 4, 2021

(30) Foreign Application Priority Data
Apr. 29, 2020 (EP) .................................. 20172169

(51) Int. Cl.
*G06T 7/30* (2017.01)
*G06T 7/136* (2017.01)
(Continued)

(52) U.S. Cl.
CPC .............. *G06T 7/30* (2017.01); *G06K 9/6256* (2013.01); *G06K 9/6267* (2013.01); *G06T 3/40* (2013.01);
(Continued)

(58) Field of Classification Search
CPC ... G06T 7/30; G06T 7/11; G06T 7/136; G06T 7/70; G06T 3/40; G06T 2207/20132;
(Continued)

(56) References Cited

U.S. PATENT DOCUMENTS 5,506,918 A * 4/1996 Ishitani .................. G06T 3/608
  382/176
7,149,347 B1 * 12/2006 Wnek .................... G06V 10/22
  382/209
(Continued)

FOREIGN PATENT DOCUMENTS

| EP | 3511861 A1 | 7/2019 | |
| EP | 3588364 A1 | 1/2020 | |
| WO | WO-2018044683 A1 * | 3/2018 | ............. G02B 21/34 |

OTHER PUBLICATIONS

Berenguel, et al., "E-Counterfeit: a Mobile-Server Platform for Document Counterfeit Detection", Available Online al https://arxiv.org/pdf/1708.06126.pdf, Aug. 21, 2017, 6 pages.
(Continued)

*Primary Examiner* — John B Strege
(74) *Attorney, Agent, or Firm* — Cesari & McKenna, LLP

(57) ABSTRACT

A computer-implemented method for extracting information from a document, for example an official document, is disclosed. The method comprises acquiring an input image comprising a document portion; performing image segmentation on the input image to form a binary input image that distinguishes the document portion from the remaining portion of the input image; estimating a first image transform to align the binary input image to a binary template image, using the first image transform on the input image to form an intermediate image; estimating a second image transform to align the intermediate image to a template image; using the second image transform on the intermediate image to form an output image; and extracting a field from the output image using a predetermined field of the template image.

15 Claims, 12 Drawing Sheets

(51) Int. Cl.
| | |
|---|---|
| *G06T 7/11* | (2017.01) |
| *G06T 7/70* | (2017.01) |
| *G06K 9/62* | (2022.01) |
| *G06T 3/40* | (2006.01) |
| *G06V 10/22* | (2022.01) |
| *G06V 30/414* | (2022.01) |
| *G06V 30/10* | (2022.01) |

(52) U.S. Cl.
CPC ............... *G06T 7/11* (2017.01); *G06T 7/136* (2017.01); *G06T 7/70* (2017.01); *G06V 10/22* (2022.01); *G06V 30/414* (2022.01); *G06T 2207/20132* (2013.01); *G06T 2207/30176* (2013.01); *G06V 30/10* (2022.01)

(58) Field of Classification Search
CPC ........ G06T 2207/30176; G06K 9/6256; G06K 9/6267; G06V 10/22; G06V 10/7515; G06V 30/414; G06V 30/10; G06V 30/40
See application file for complete search history.

(56) References Cited

U.S. PATENT DOCUMENTS

| | | | |
|---|---|---|---|
| 11,004,181 B2* | 5/2021 | Farivar | .................... G06N 3/08 |
| 2015/0254869 A1* | 9/2015 | Tanaka | .................. G06T 3/0006 |
| | | | 382/176 |
| 2015/0278593 A1* | 10/2015 | Panferov | .............. G06K 9/6255 |
| | | | 382/182 |
| 2016/0371246 A1* | 12/2016 | Deepak | ................. G06F 40/169 |
| 2017/0236034 A1 | 8/2017 | Dolev | |
| 2019/0180097 A1* | 6/2019 | Ferguson | ............... G06N 7/005 |
| 2019/0220660 A1* | 7/2019 | Cali | ......................... G06N 3/08 |
| 2021/0064865 A1* | 3/2021 | Rimchala | .................. G06F 3/14 |
| 2021/0124919 A1* | 4/2021 | Balakrishnan | ....... G06V 30/245 |
| 2022/0237800 A1* | 7/2022 | Iyer | .......................... G06T 7/11 |

OTHER PUBLICATIONS

Chen, et al., "Rethinking Atrous Convolution for Semantic Image Segmentation", Available Online at https://arxiv.org/pdf/1706.05587.pdf, Dec. 5, 2017, 14 pages.

EP20172169.3, "Extended European Search Report", dated Oct. 22, 2020, 9 pages.

Evangelidis, et al., "Parametric Image Alignment using Enhanced Correlation Coefficient Maximization", IEEE Transactions on Pattern Analysis and Machine Intelligence, vol. 30, No. 10, Nov. 2008, pp. 1-8.

Rocco, et al., "Convolutional Neural Network Architecture for Geometric Matching", IEEE Conference on Computer Vision and Pattern Recognition, 2017, pp. 6148-6157.

Szegedy, et al., "Rethinking the Inception Architecture for Computer Vision", In Proceedings of the IEEE Conference on Computer Vision and Pattern Recognition, Dec. 11, 2015, 10 pages.

\* cited by examiner

SCALABLE, FLEXIBLE AND ROBUST TEMPLATE-BASED DATA EXTRACTION PIPELINE

CROSS-REFERENCES TO RELATED APPLICATIONS

This application claims priority to European Patent Application Number 20172169.3, filed Apr. 29, 2020.

TECHNICAL FIELD

The invention relates to a method for extracting data from a document. More specifically, the invention relates to a computer-implemented method, a computer readable medium and a server for extracting data from an official document.

BACKGROUND OF THE INVENTION

Official documents are often used to verify the details of people. This is typically performed manually. For example, a representative of a car rental company may check a customer's driving license before authorizing the rental of a car to the customer. Such checking implicitly requires manual verification of the presented documents and extraction of the data contained therein. Manual verification and extraction is a skilled and labor intensive process that leads to uncertainty and processing bottlenecks. For this reason, various techniques have been developed to automate aspects of the verification process, including to automate the extraction of data from official documents. One example is the use of computers to extract data using optical character recognition (OCR) from an image of an official document.

However, automated data extraction from official documents is a formidable computational challenge which makes it difficult to achieve a high level of accuracy within a reasonable runtime. As a consequence, existing automated data extraction processes are often very limited. For instance, a data extraction process may only be able to process a selected type of official document and/or a strictly controlled environment may be required to capture an image of the official document before the data extraction process is performed.

There are two main factors which cause automated data extraction to be a formidable computational challenge. The first factor is the amount of input noise that the automated data extraction pipeline is able to handle. This input noise is made up of both intrinsic and extrinsic noise, where extrinsic noise is a result of how the image of the official document is captured, whilst intrinsic noise is derived from the official document itself. For instance, extrinsic noise may result from sensor and optical element non-uniformity of the capture device, or poor illumination or focus. Intrinsic noise may include variations in the document printing process such as variable 3D holograms that cast shadows of color on text data in the official document.

Typically, data extraction processes are only able to handle small amounts of input noise which means that a controlled environment is often used to capture the official document, thereby reducing the extrinsic noise. For instance, an official document may be scanned using a flatbed scanner, which has uniform lighting and orientation in at least one plane. However, equipment for capturing an official document in a controlled environment is not always readily available. Accordingly, it is sometimes desirable to capture images of official documents in an uncontrolled environment, for example by a mobile electronic device such as a mobile phone. However, the extrinsic noise associated with these images is much higher, leading to poor accuracy when extracting data using existing data extraction processes.

The second and arguably more important factor is the scalability of the automated data extraction process for handling different types of official document. As can be readily appreciated, the number of different types of official documents with different structures of data is vast since most countries issue unique passports, birth certificates, driving licenses, etc. which typically change in form over time. Accordingly, an automated data extraction process that can handle a significant number of different types of official document is highly desirable. However, for each additional type of official document that an automated data extraction process handles, there is a significant computational cost, which means that existing data extraction processes are typically limited to one or a few types of official document.

To overcome limitations with existing data extraction processes, the data extraction pipeline described in EP 3 511 861 A1 and shown as data extraction pipeline 100 in FIG. 1A was devised. Data extraction pipeline 100 works by first performing classification 110 in which the acquired image is classified as containing a particular document type. Then, after pre-processing 120, a segmenting step 130 step is performed in which the recognized data in the official document is identified in segments. These segments are extracted in step 140 using OCR. Then, after post-processing 150, the extracted data is output. Each of steps 120, 130 and 140 uses either a traditional (i.e. not deep-learning based) machine learning or a deep learning-based model. As a consequence, processing pipeline 100 provides scalability with a high input noise tolerance whilst having a faster runtime and being more accurate than known data extraction processes.

An example of an image of an official document which has been processed using data extraction pipeline 100 is shown in FIG. 1B. The image in FIG. 1B being processed is a digital photograph of a Brazilian driving license. Only a portion of the image is of the Brazilian driving license, the remaining portion shows a white background. First, at step 110, the image being classified is a Brazilian driving license. Then, at step 120, pre-processing is performed in order to focus on the document and remove its rotation. At step 130, segments corresponding to recognized data in the image are identified and coordinates of the segments are determined. In this example, the recognized data corresponds to name, region (RG in FIG. 1B), social security number (CPF in FIG. 1B), date of birth (DOB in FIG. 1B), document number (R. Num in FIG. 1B), date of expiry (DOE in FIG. 1B) and date valid (DOV in FIG. 1B). From this, the segments are extracted from the image, and OCR is performed on the segments in step 140. After post-processing step 150, the data extraction pipeline 100 outputs the name, region, social security number, date of birth, document number, date of expiry and date valid information identifier in the Brazilian driving license in text format.

Whilst data extraction pipeline 100 is much improved other known data extraction programs, a problem with data extraction pipeline 100 is that pre-processing step 120, segmentation step 130 and OCR step 140 are each performed using either a traditional machine learning or a deep learning-based model, which are trained specifically for a certain type of document. This means that when a new document type is on-boarded into data extraction pipeline 100, large amounts of sample documents of that document type can be required in order to train each of the traditional machine learning and deep learning-based models. Although this is not a problem for common documents types, such as a British passport or a Brazilian driving license, for less commonly seen document types, such as a Gibraltar driving license or an Idaho national identity card, it can be difficult to obtain sufficient amounts of sample data. Moreover, there is a time penalty associated with training deep learning-based models, which means that new versions of a document cannot be on-boarded quickly.

BRIEF SUMMARY OF THE INVENTION

The invention is defined by the independent claims with further optional features being defined by the dependent claims.

In a first aspect of the invention, there is a computer-implemented method for extracting data from a document. The method involves acquiring an input image comprising a document portion, the document portion being of a document of a first document type; performing image segmentation on the input image to form a binary input image that distinguishes the document portion from the remaining portion of the input image; estimating a first image transform to align the binary input image to a binary template image; using the first image transform on the input image to form an intermediate image; estimating a second image transform to align the intermediate image to a template image, the template image comprising a template document portion, the template document portion being of a different document of the first document type; using the second image transform on the intermediate image to form an output image; and extracting a field from the output image using a predetermined field of the template image.

The method of the first aspect of the invention overcomes the scalability and input noise factors that limits known data extraction processes, whilst also not relying on allow data to be extracted from a document without the need for traditional machine learning models or deep-learning based models which are specific for a type of document and which require large amounts of sample data to be trained. Instead, using a template image with the steps of document segmentation and template image projection, the document of the input image is aligned with the document of the template image. The alignment is very accurate because input noise is dealt with effectively by the multi-stage alignment process. In particular, the first image transform handles extrinsic noise from the input image, whilst the second image transform handles both extrinsic and intrinsic noise. Then, since the predetermined fields of the template image are known, the same fields can easily be extracted from the input image, without the need for further analysis of the input image. By using the template image and avoiding the use of traditional machine learning models and deep-learning based models that are specific for a type of document in this way, the data extraction pipeline is able to on-board new document types using only a single authentic example of said document type, and is able to on-board such documents types much quicker.

In certain embodiments, estimating the first image transform, using the first image transform, estimating the second image transform, and using the second image transform, do not use a deep learning-based model. Accordingly, these steps are particularly robust to input noise and perform well regardless of the document type, and as a consequence the document of the template image is aligned with the official document of the input image with a high degree of accuracy.

In certain embodiments, the template document portion has predetermined coordinates in the template image. In such embodiments, the method further comprises, after using the first image transform and prior to estimating the second image transform, cropping the intermediate image using the predetermined coordinates and cropping the template image using the predetermined coordinates. This causes a substantial amount of the remaining portion to be removed from the intermediate image, leaving mainly the document portion. As a consequence, the step of estimating the second image transform uses mainly the information contained in the document portion, which increases the robustness of the estimation compare to using an uncropped intermediate image. Moreover, the number of pixels that need to be processed in the subsequent steps of the method is reduced, thereby reducing complexity and processing time of those steps.

In certain embodiments, the method further comprises, after using the first image transform and prior to estimating the second image transform, reducing the size of the intermediate image and the template image using a resize operator; and, after estimating the second image transform and prior to using the second image transform, applying a transverse of the resize operator to the second image transform. These steps significantly improve processing time of the estimating the second image transform step.

In certain embodiments, wherein the binary input image is a binary segmentation mask of the same size as the input image that represents the document portion with a pixel value of 255 and the remaining portion with a pixel value of 0, and the binary template image is a binary segmentation mask of the same size as the template image that represents the template document portion with a pixel value of 255 and the remaining portion with a pixel value of 0. This increases the distinction between the document portion or template document portion and the remaining portion so as to reduce noise from any details in the document or the background of the input image or template image, behind the document.

In certain embodiments, wherein the predetermined field has predetermined coordinates within the template image, and extracting the field comprises using the predetermined coordinates. This is a simple and effective way of extracting from the input image the pixels which contain the desired data and relies on the high degree of accuracy of alignment.

In certain embodiments, wherein the field is a text field, the method further comprising cropping the text field so that the text field fits the text contained therein and performing optical character recognition on the text field to extract text from the document. In other embodiments, wherein the field is a machine readable zone, the method further comprising performing optical character recognition on the machine readable zone to extract machine readable data from the document. In yet other embodiments, the field is an image field. In this way, method of the invention is versatile and able to extract different types of data from within a document. In certain embodiments, the optical character recognition (OCR) is performed using a deep learning-based OCR model, and the method further comprises generating training images to train the deep learning-based OCR model.

In certain embodiments, the first image transform comprises a plurality of first image transforms, each of the plurality of first image transforms configured to align a different sub-frame of the binary input image to the binary template image. Additionally or alternatively, the second image transform comprises a plurality of second image transforms, each of the plurality of second image transforms configured to align a different sub-frame of the intermediate input image to the template image. Using a plurality of first image transforms and/or second image transforms increases the amount of noise that the method can handle and compensate for.

In certain embodiments, the method further comprises, prior to performing image segmentation, pre-processing the input image by determining document location within the input image and estimating the pose of the document within the input image, and the scope of the tasks performed by deep learning-based models in subsequent steps of the method is reduced, which helps to make these steps more accurate.

In certain embodiments, the method further comprises, prior to performing image segmentation, classifying the document of the input image as the first document type, and retrieving the template image and the binary template image of the first document type from a database. By including a classification step, the method of the invention is able to identify different types of document in the input images, and extract data from input images of different types of document.

In certain embodiments, the method further comprises: acquiring a second input image comprising a document portion, the document portion being of a document of a second document type; performing image segmentation on the second input image to form a second binary input image that distinguishes the document portion from the remaining portion of the second input image; estimating a third image transform to align the second binary input image to a second binary template image, using the third image transform on the second input image to form a second intermediate image; estimating a fourth image transform to align the second intermediate image to a second template image, the second template image comprising a template document portion, the template document portion being of a different document of the second document type; using the second image transform on the second intermediate image to form a second output image; and extracting a field from the second output image using a predetermined field of the second template image. This illustrates that the method of the invention is able to extract data from input images of different types of document In a second aspect of the invention, there is a computer-readable medium comprising executable instructions for performing the methods of the invention.

In a third aspect of the invention, there is a server comprising a processor configured to execute executable code stored in memory, wherein the executable code comprises instructions for performing the methods of the invention.

BRIEF DESCRIPTION OF THE DRAWINGS

Embodiments of the invention are described below, by way of example, with reference to the following drawings, in which.

DETAILED DESCRIPTION OF THE INVENTION

Figure 2:
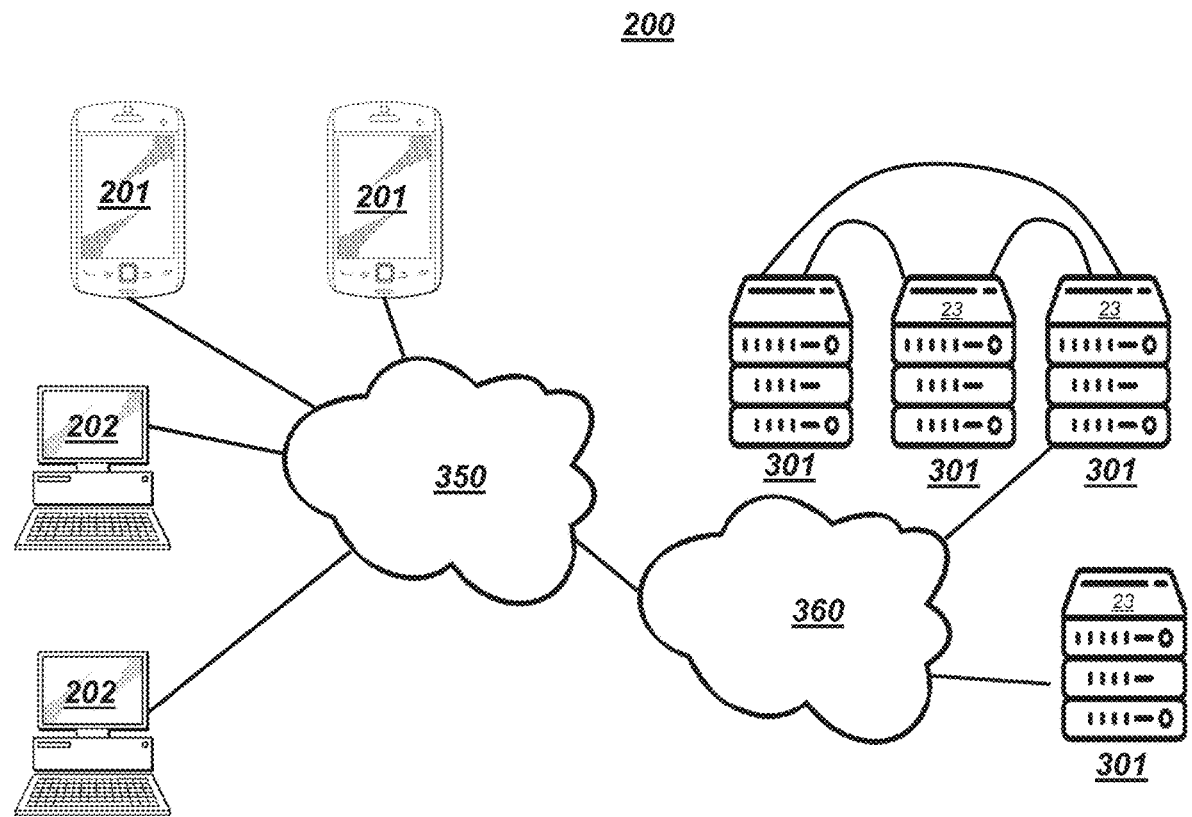
FIG. 2 is a component diagram of a system that may be used to implement the present invention.

FIG. 2 shows a system 200 in which according to one embodiment the invention is implemented. The system comprises electronic devices, including at least one mobile electronic device 201 and at least one fixed location electronic device 202, and also comprises at least one server 301. The electronic devices are in communication with at least one communication network 360, which may include wireless network 350. Data can also be communicated between the electronic devices. The at least one communication network 360 may comprise the internet, a local area network, a wide area network, and the like. The wireless network 350 may be, for instance, a cellular (e.g. a 3G network, 4G network, 5G network), WiFi communication network, or any other known wireless communication network. The described network architecture is only exemplary and modifications to it, including removing or adding of network components, are possible.

Figure 3:
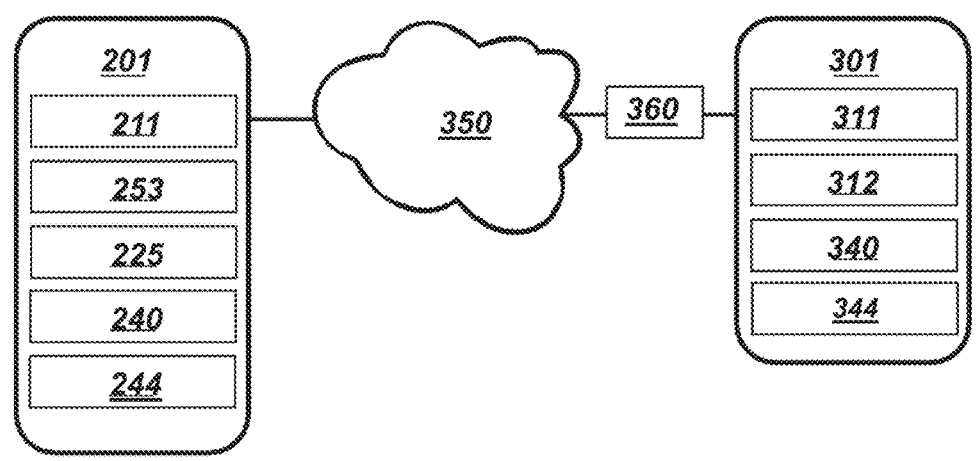
FIG. 3 is a diagram showing components of the system of FIG. 2.

FIG. 3 shows selected aspects of system 200 of FIG. 2. Specifically, FIG. 3 shows a mobile electronic device 201 in communication, over a wireless network 350 and the internet 360, with a server 301. Server 301 is an electronic device that can be accessed across the internet 360 and wireless network 350 by mobile electronic device 201 to perform computational tasks. Mobile electronic device 201 comprises a communication subsystem 211 to enable communication across the wireless network 350. Mobile electronic device 201 may be, for example, a digital camera, a tablet, a laptop, or a mobile telephone (cell phone). The mobile electronic device 201 further comprises application software 225 that executes on processor 240, and camera 253 that can be used to acquire an image file by taking a digital photograph using mobile electronic device 201. Typical image file formats include JPEG, PNG, GIF, TIFF, PDF, etc. The image file and application software 225 are stored in memory 244 on the mobile electronic device 201.

FIG. 3 also shows server 301, which is connected to the internet 360 (and indirectly to wireless network 350) by a network interface (not shown). Server 301 comprises application software 312 that is executed on processor 340. The server further comprises memory 344 on which the application software 312 and any data that is received from the wireless network 350, and any electronic device connected thereto, can be stored. An example of data received from wireless network 350 is image files received from mobile electronic device 201. Memory 344 of server 301 comprises one or more databases configured to store data. For example, memory 334 may have one database for image files received from mobile electronic device 201, and another database for template images (as discussed further herein). Optionally, server 301 may be distributed and comprise multiple servers, several processors and/or several memory storage locations. Such a distributed server 301 may operate by distributing computational tasks and data across its constitute parts and may communicate with other servers to perform computational operations.

As mentioned, mobile electronic device 201 acquires images files using camera 253. In accordance with the invention, acquired image files include, at least in part, an image of an official document 400. In particular, the user of mobile electronic device 201 is prompted by a software application 225 to take a digital photograph of an official document 400 with their mobile electronic device 201. The resulting image file contains a portion which is of the official document 400 (referred to herein as the "document portion"), and a remaining portion which is not of the official document 400. The remaining portion, which is not of the official document 400, is typically the surface which the user rests the official document 400 on to take the digital photograph. The image file is then sent to server 301 in accordance with instructions from software application 225. Server 301 then stores the image file in memory 334. In the server 301, application software 312 executes on the processor 340 to extract information from the official document 400 contained in the image file. The result of this extraction may be communicated back across the wireless network 350 to the mobile electronic device 201 and displayed on to the user.

Official document 400 may take one of many forms such as a driving license, a passport, a utility or other bill, a birth certificate, a benefits book, a state identify card, or a residency permit. The term official document 400 is therefore intended to cover any document that contains structured information that may be used to verify a person's identity or an aspect relating a person (e.g. their name, address, facial image). The structured information is arranged in fields which each have a predetermined location within the official document 400 and predetermined content (e.g. name, address, facial image) based on the type of official document.

The concept of "document type", as referred to herein, is a group of official documents 400 for which the structured information is arranged in the same predetermined fields. Some examples of document type include a British passport, a Brazilian driving license, a Gibraltar driving license, an Idaho national identity card, and more. The complete list of document types is too long to be included here, and is continually evolving. Nevertheless, an advantage of the invention is that information can be extracted from an official document 400 of any document type, as long as at least one template image of the document type is present in memory 334.

Figure 4:
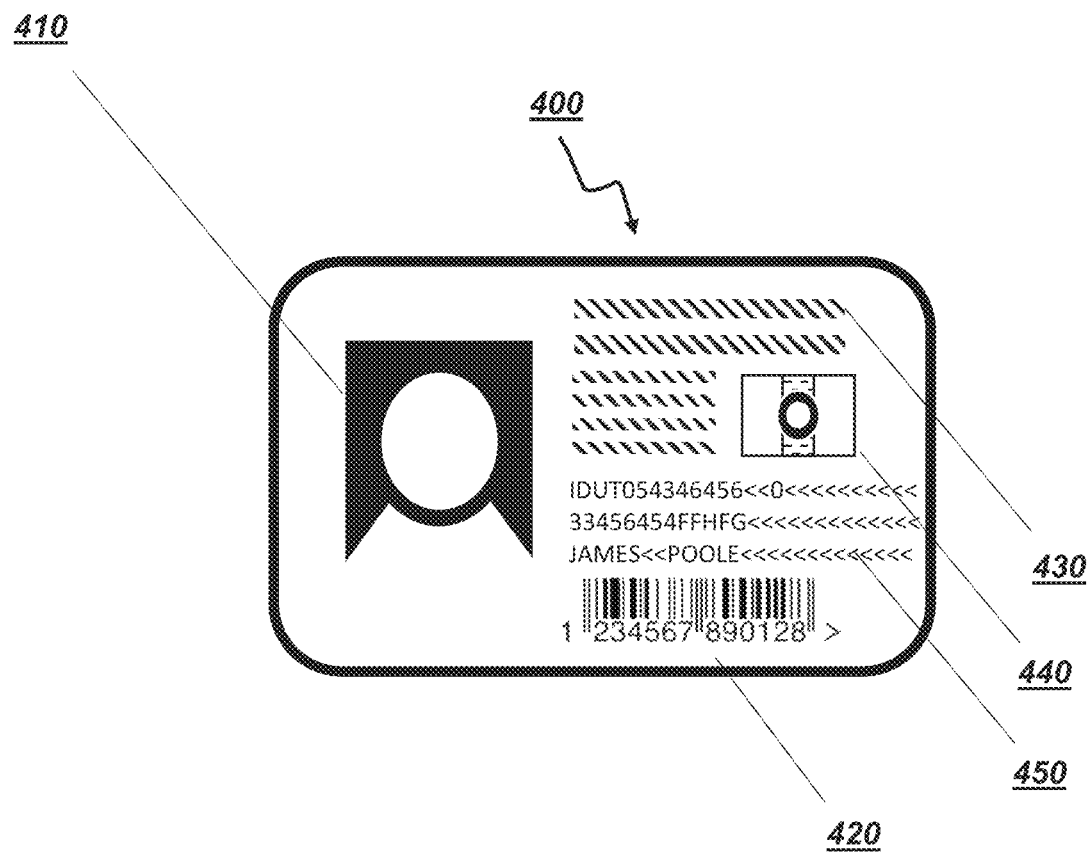
FIG. 4 presents a block image of an official document.

Referring to FIG. 4, official document 400 typically comprises one or more features such as text, an image, machine-readable code (MRC), machine-readable zone (MZR) field. As mentioned, for a particular document type, these features are arranged in predetermined fields. Depending on the document types, these predetermined fields can take the form of an image field 410, an MRC field 420, a text field 430, a secondary image field 440, and an MZR field 450. Typically, predetermined fields of an official document 400 are restricted or difficult to obtain in order to reduce the likelihood of counterfeiting.

The number of text fields 430 present in official document 400 depends on the document type. Example official document 400 of FIG. 4 includes six text fields 430, each corresponding to a line of text in official document 400. The text in each text field 430 may be in a particular format and type, possibly including a particular font. The text in each text field 430 may also be limited to one or a subset of possible options. As an example, in an exemplary official document 400, 8 mm in from the left edge and 20 mm down from the top edge may have the term "DRIVING LICENSE" printed in 10 point size of a special font. As another example, text corresponding to a date may be in a "DD-MM-YYYY" format.

Certain types of official document 400 include an image field 410 which contains a facial photograph. Certain other types of official document 400 include a secondary image field 440 which contains a secondary facial photograph, or a different image such as a national flag.

Certain types of official document 400 include a predetermined MRC field 420, such as a barcode. Generally speaking, MRC comprises an image that encodes information. The image is machine-readable by optical scanning. An MRC may be a barcode comprising parallel lines of varying widths and spacing in-between, or it may be a two dimensional pattern which may use rectangles, dots, and other geometric shapes. An example of a two dimensional barcode is a QR code.

Certain types of official document 400 are a machine-readable travel document (MRTD), such as a machine-readable passport (MRP), which have an MRZ field 450. The MRZ field 450 comprises information encoded into a series of special characters which may be in the structure and format according to the standards described by International Civil Aviation Organization document 9303. The MRZ field 450 is designed to be read by a computer using OCR and enables faster or easier processing of documents than manually assessed passports.

Data Extraction Pipeline Overview

Figure 5:
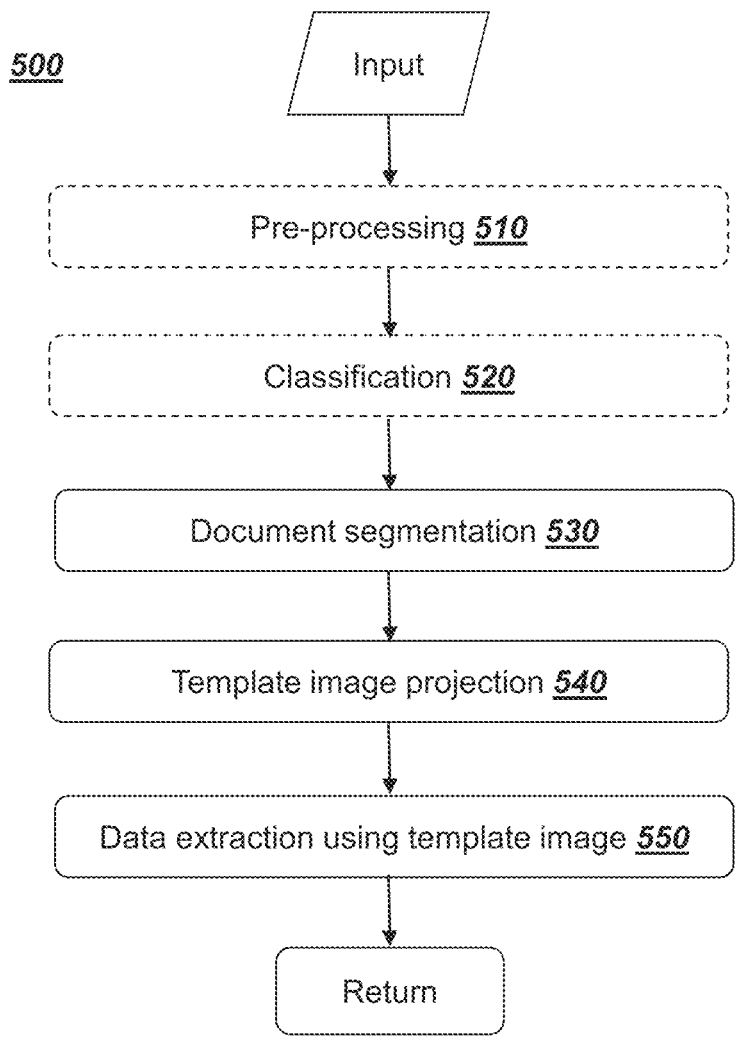
FIG. 5 presents a flow diagram of a data extraction pipeline according to the present invention.

FIG. 5 shows a data extraction pipeline 500 according to the invention for extracting information from official document 400. However, it should be appreciated that data extraction pipeline 500 is not limited to processing official documents. Any document which has a known format containing structured information arranged in predetermined fields can be used. For example, a government issued Energy Performance Certificate (EPC) of a property or food hygiene rating certificate are suitable for use with data extraction pipeline 500. Data extraction pipeline 500 is a software application 225 stored in memory 334 of the server 301. The steps of data extraction pipeline 500 are effectuated by instructions from the software application 225 to the processor 340 of the server 301.

In order to perform data extraction pipeline 500, a minimum of two images is required. First, an input image 600 which comprises a document portion, the document portion consisting of an official document 400 of a first document type. Second, a template image 620 which comprises a template document portion, the template document portion consisting of a different official document 400 of the first document type than the input image 600. For example, the document portion of input image 600 may be a UK passport belonging to a first person, Adam Baker, whilst the template document portion of template image 600 may be a UK passport belonging to a second person, Dan Goudie. As is evident from this example, the template document is no different from an official document 400 (at least, an official document 400 which is authentic). This makes on-boarding a new type of official document 400 simple because any image which comprises an official document 400 may be used as the template image 620, as long as the official document 400 contained therein is known to be authentic. The main difference between the template image 620 and the input image 600 for the purpose of data extraction pipeline 500 is that the input image 600 is acquired by server 301 from a mobile electronic device 201, whilst the template image 620 is stored in a database in memory 334.

Figure 11:
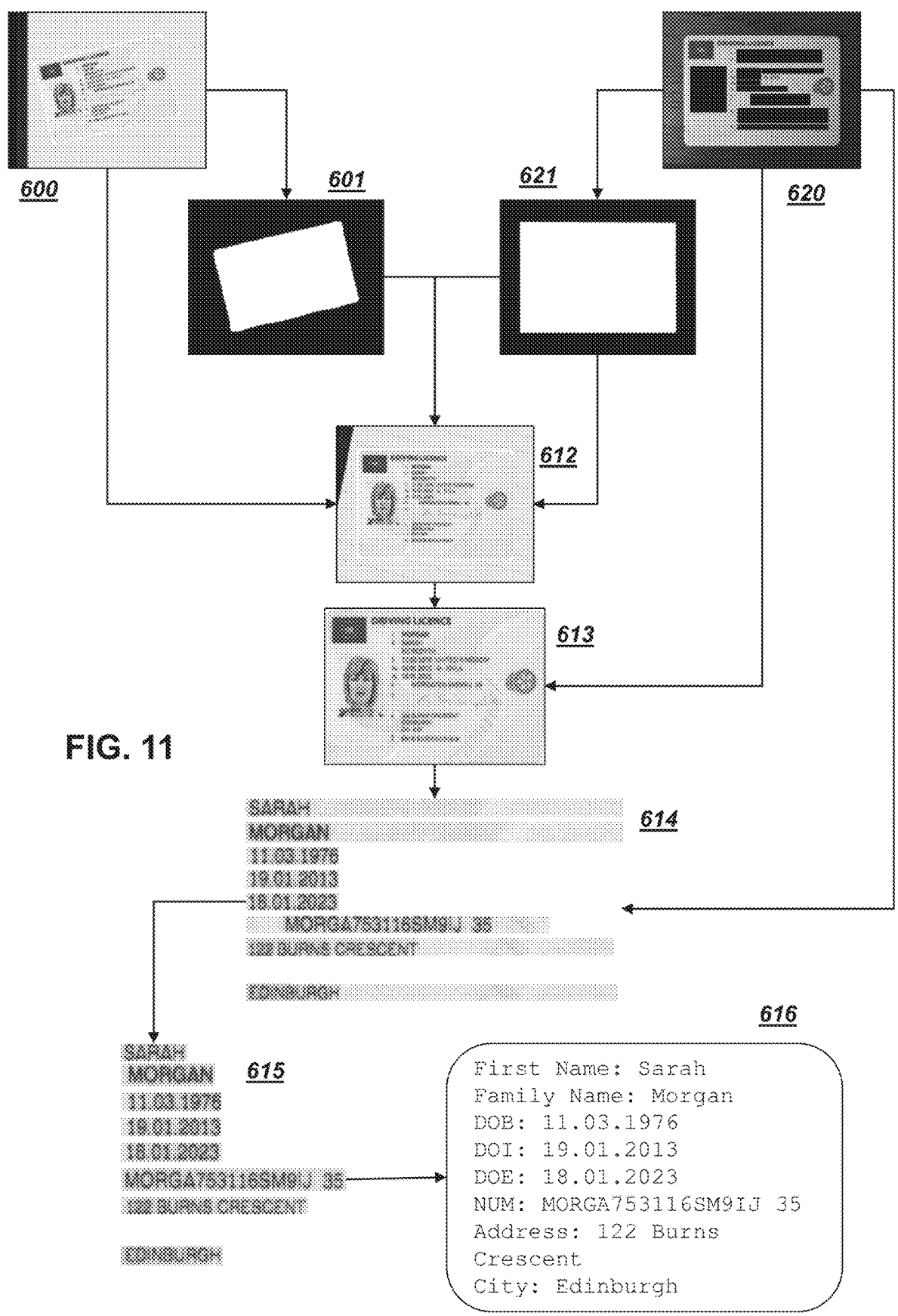
FIG. 11 presents an example document processed using a data extraction pipeline according to the present invention.

Before processing input image 600 with data extraction pipeline 500, a binary template image 621 may be formed using the template image 620. The binary template image 621 distinguishes the template document portion from the remaining portion of the template image 620. For example, the binary template image 621 may be a binary segmentation mask of the same size as the template image 620 that represents the template document portion with a pixel value of 255 and the remaining portion with a pixel value of 0. This increases the distinction between the template document portion and the remaining portion so as to reduce noise from any details in the official document 400 or the background of the template image, behind the official document 400. Additionally, the predetermined fields of the template official document in template image 621 may be determined. As previously discussed for official document 400, the predetermined fields can take the form of an image field 410, an MRC field 420, a text field 430, a secondary image field 440, and an MZR field 450. The binary template image 621 and predetermined fields of a template image 620 are stored in a database in memory 334 of server 301 for retrieval by processor 340 (either the same or a different database to the template image 620). An example binary template image 621 and its corresponding template image 620 with predetermined fields are shown in FIG. 11. Further detail about the processes that may be performed before processing input image 600 with data extraction pipeline 500 is provided in the document on-boarding section below. Alternatively, these processes may be performed as part of data extraction pipeline 500.

Referring back to FIG. 5, data extraction pipeline 500 includes the steps of document segmentation 530, template image projection 540 and data extraction using the template image 550. Each one of steps 530, 540 and 550 is a different processing module. Modularity of data extraction pipeline 500 in this way allows data extraction pipeline 500 to be flexible and thereby achieve high performance. Broadly speaking, document segmentation 530 involves performing image segmentation on the input image 600 to form a binary input image 601 that distinguishes the document portion from the remaining portion of the input image. Then, template projection 540 is performed which involves using a multi-stage alignment process. In particular, a first image transform to align the binary input image 601 to a binary template image 621 is estimated, and this first image transform is used on the input image 600 to form an intermediate image 612. Then, a second image transform to align the intermediate image 612 to a template image 620 is estimated, and the second image transform used on the intermediate image 612 to form an output image 613. Once template projection 540 has been performed in this way, data extraction is performed using the template image 620. In particular, a field 614 is extracted from the output image 613 using a predetermined field of the template image 620.

The above-mentioned steps of document segmentation 530, template image projection 540 and data extraction using the template image 620 overcome the scalability and input noise factors that limits known data extraction processes, whilst allowing data to be extracted from an official document 500 without the need for traditional machine learning models or deep-learning based models which are specific for a type of official document 400 and which require large amounts of sample data to be trained. In particular, by using document segmentation 530 and template image projection 540, the official document 400 of the template image 620 is aligned with the official document 400 of the input image 600. Then, since the predetermined fields of the template image 620 are known, the same fields can easily be extracted from the input image 600, without the need for further analysis of the input image 600 (for instance, without analysis of the structure of input image 600, and without analysis of the semantic meaning of fields within the input image 600). By avoiding the use of traditional machine learning models or deep-learning based models that are specific for a type of official document 400 in this way, data extraction pipeline 500 is able to on-board new document types using only a single authentic example of said document type, and is able to on-board such documents types much quicker. Thus, the data extraction pipeline 500 is highly scalable.

The steps of document segmentation 530 and template projection 540 cause the official document 500 of the template image 620 to be aligned with the official document 500 of the input image 600 with a high degree of accuracy. This is otherwise difficult to achieve because of high input noise. Input noise is made up of both intrinsic and extrinsic noise; extrinsic noise is a result of how the image of the official document is captured, whilst intrinsic noise is derived from the official document itself. Input image 600 is typically acquired using camera 253 of mobile electronic device 201 and therefore has particularly high extrinsic noise. For example, extrinsic noise may result from sensor and optical element non-uniformity of the mobile electronic device 201, or the official document 400 may be poorly illuminated or focused. Moreover, the position of the document portion is generally misaligned within the input image 600 in three dimensions (i.e. has both perspective and geometric distortions). Misalignment of the official document 400 within input image 600 like this occurs because, when camera 253 is used to take a digital photograph of official document 400, it is highly unlikely that camera 253 is exactly perpendicular to the official document 400. Aligning with a high degree of accuracy is important for data extraction pipeline 500 because the predetermined fields which are subsequently extracted from input image 600 are typically used for authentication of the official document 400, where poor alignment accuracy leads to poor authentication capabilities.

Aligning the official document 500 of the template image 620 with the official document 500 of the input image 600 could be performed directly in a single step by using, for example, the appearance (e.g. RGB values of pixels) of both official documents. However, this is not sufficient for accurate alignment as it can be heavily affected by the initial position of the two official documents within the template image 620 and the input image 600 respectively, as well as the input noise. This is why the multi-stage alignment process of template image projection 540 is used. In the first stage, the binary input image 601 and the binary template image 621 are aligned, which is more accurate than using the input image 600 and the template image 620 because intrinsic noise from the details of the official document 500 is ignored, allowing the first stage to focus on the extrinsic noise. Then, after aligning the input image 600 and the template image 620 in the same way as determined for the binary input image 601 and the binary template image 621, a second stage of alignment is performed using the input image 600 and the template image 620. This second stage increases the accuracy of the alignment further still, allowing both intrinsic and extrinsic noise to be taken into consideration.

Data extraction pipeline 500 of FIG. 5 also includes a pre-processing step 510 and a classification step 520 which are performed before document segmentation 530. Both these steps are optional as pre-processing, which is performed on the input image 600 in order to put the input image 600 in a more appropriate form for document segmentation, and classification of the type of official document 400 contained in the input image 600, may be performed as part of a separate data pipeline. For example, input image 600 may be input into data extraction pipeline 500 with the document type already being known. It should be appreciated that the pre-processing step 510 and classification step 520 may be performed in either order.

The steps of data extraction pipeline 500 shown in FIG. 5 are explained in further detail in the follow sections.

Pre-Processing

Input image 600, which contains an official document 400, is acquired by the server 301, which performs the steps of data extraction pipeline 500, from a mobile electronic device 201. In particular, input image 600 is captured through camera 253 of mobile electronic device 201 by taking a digital photograph and the resulting image file is sent to server 301 in accordance with instructions from software application 225 on mobile electronic device 201. Server 301 then stores the image file in memory 334, perhaps in a dedicated database. Input images acquired in this way often suffer from issues such as perspective distortions, geometric distortions and complex environment lighting. Pre-processing 510 therefore involves multiple steps from coarse to fine scales in order to gradually progress an accurate and efficient extraction of the foreground of input image 600, which contains the document portion. As mentioned with respect to FIG. 5, the step of pre-processing 510 is optional. If performed, pre-processing 510 occurs before document segmentation 530, and may be before or after the classification step 520.

Figure 6:
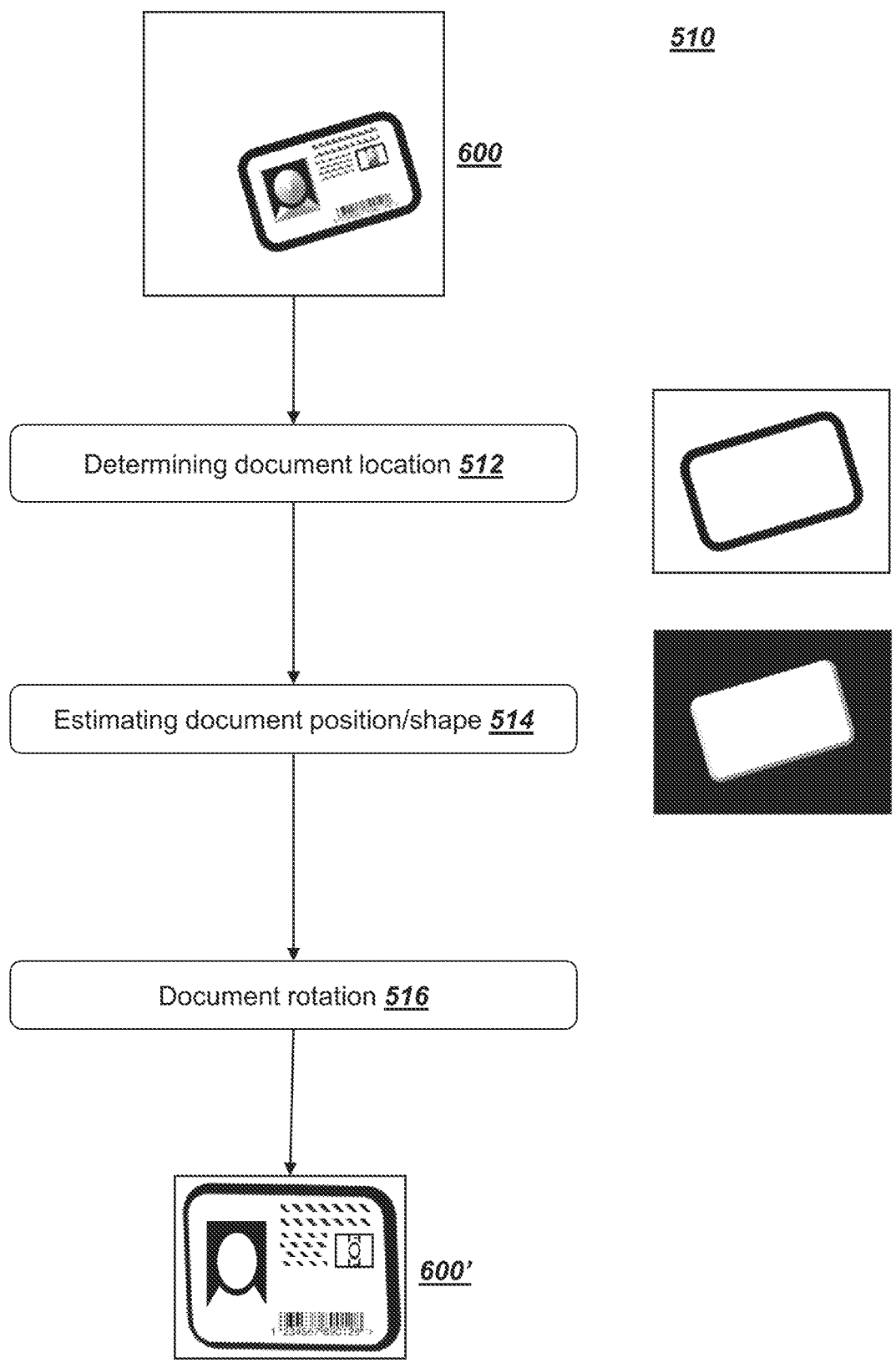
FIG. 6 is a flow diagram of a method of pre-processing according to the present invention.

With reference to FIG. 6, the first step of pre-processing 510, step 512, is determining the location of the official document 400 within the input image 600. This is performed by estimating the coordinates of the document portion in the input image 600 using a bounding box around the document portion. The bounding box is rectangular in shape, which means that any perspective distortions of the official document 400 within input image 600 are not accounted for, and as a result the bounding box contains both the document portion and some of the remaining portion of the input image 600 (i.e. because the official document 400 does not appear rectangular in the input image 600). A confidence score may also be calculated for the bounding box which indicates the confidence that the official document 400 is wholly contained within the bounding box. Input image 600 is then cropped using the bounding box, so only the part of the input image 600 within the bounding box is retained.

At step 514, the pose of the official document 400 within the cropped input image 600 is determined. The pose indicates the orientation of the official document 400 relative to the orientation of the input image 600 using only their respective perpendicular axes. For example, an official document 400 which has a 180° rotation within the input image 600 appears upside down in the input image 600. In some instances, the pose estimated may be limited to discrete values such as 0°, 90°, 180° to reduce processing time. For example, all relative rotations of between 45 and −45 may be considered as having a 0° pose. Step 514 is performed using a deep learning-based model which is trained using different types of official document 400 and is therefore able to perform pose determination regardless of document type. At step 516, the cropped input image 600 is rotated using the pose that has been determined.

The result of pre-processing is adjusted input image 600' which contains an official document 400 that is still misaligned in three dimensions with respect to the adjusted input image 600' and still has perspective distortions, but is nevertheless different from input image 600. One difference between input image 600 and adjusted input image 600' is that the document portion occupies a greater proportion of the adjusted input image 600' than the input image 600. This makes processing times of the subsequent steps in data extraction pipeline 500 quicker because irrelevant pixels (i.e. pixels which are typically of the surface which the user rests the official document 400 on to take the digital photograph) are removed from the input image 600. A further difference is that the orientation of the official document 400 in the adjusted input image 600' is between 45 and −45 degrees (i.e. appearing "upright" so the text can easily be read), whereas the official document 400 can be in any orientation in the input image 600 (e.g. upside down). This reduces the scope of the task performed by deep learning-based models in other steps of data extraction pipeline 500, such as the template image project step 540, which helps to make the subsequent steps more accurate.

For the purpose of the foregoing description, input image 600 and adjusted input image 600' are interchangeable.

Classification

Figure 7:
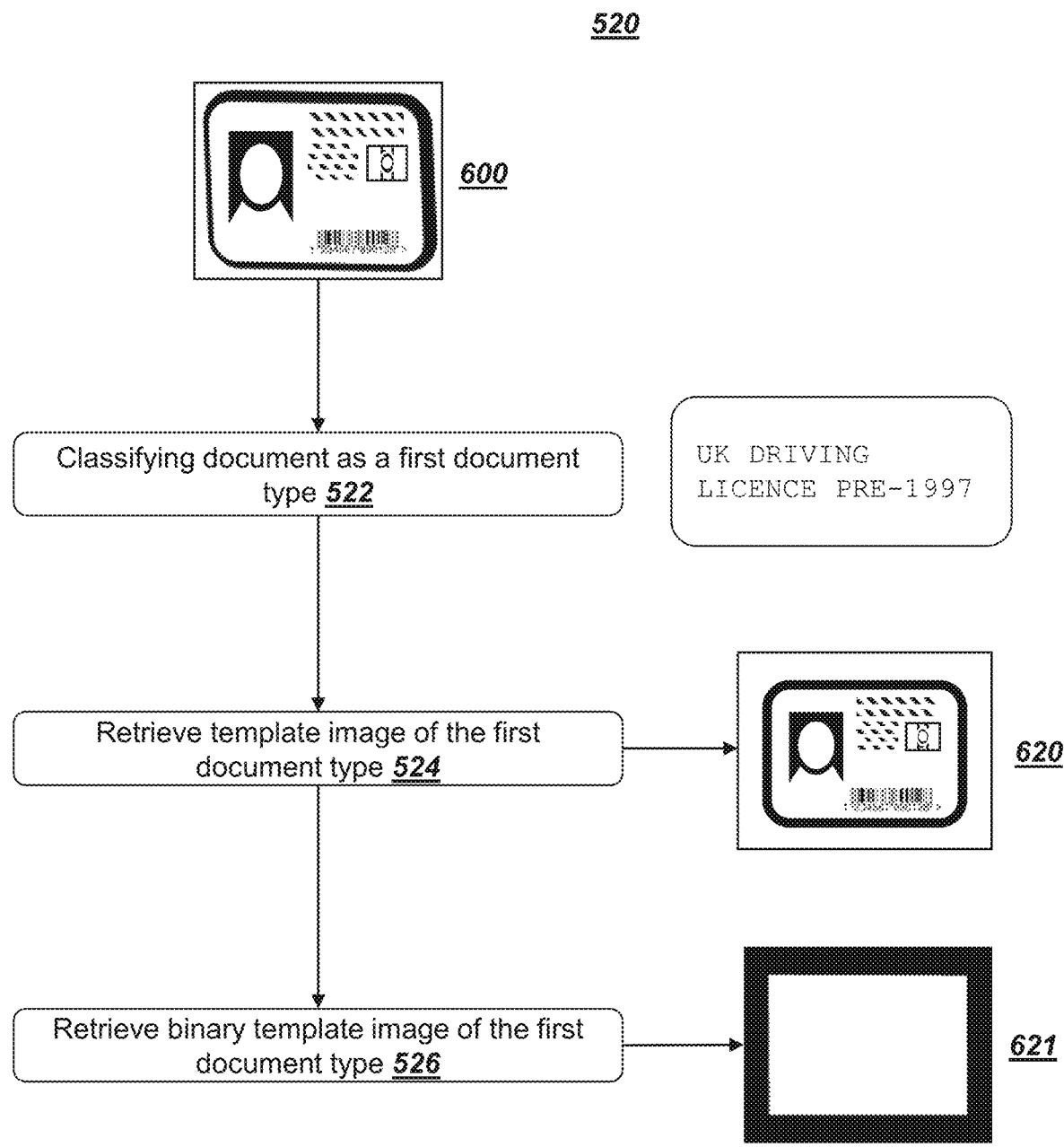
FIG. 7 is a flow diagram of a method of classification according to the present invention.

FIG. 7 shows a method for classifying the document type for the official document 400 in input image 600 (or adjusted input image 600'). Broadly speaking, the method involves: in step 522, classifying the official document 400 as a first document type; in step 524, retrieving the template image 620 (including the predetermined fields and labels) of the first document type from a database; and in step 526 retrieving the binary template image from the database. New document types are on-boarded using the document on-boarding method discussed later. In some instances, classification may not be necessary as the document type may already be known. For instance, the data extraction pipeline 500 may be used in an application where only UK driving licenses are able to be received.

Classification is performed using a deep learning-based model. One example model that can be used is Inception-V3 described in Szegedy, C., Vanhoucke, V., Ioffe, S., Shlens, J., & Wojna, Z. (2016). Rethinking the inception architecture for computer vision. In Proceedings of the IEEE conference on computer vision and pattern recognition (pp. 2818-2826). The model is trained using training images of different document types.

In order to reduce number of training images needed for each document type and also to increase the robustness of the model against different sources of noise, a normalization step is introduced during training and whilst processing of data extraction pipeline 500. During the data extraction pipeline 500, this normalization step involves performing the steps of pre-processing, described in relation to FIG. 6, and document segmentation step 530, described in relation to FIG. 8, to form a binary input image 601 from input image 600. Then, the four corners of the document portion in the binary input image 601 are identified, and used to estimate the perspective distortions and geometric distortions of the official document 400 within input image 600. Using these estimations, the input image 600 is transformed so as to reduce the perspective distortions and geometric distortions, effectively "flattening" the official document 400 within the input image 600. The same process is also performed for training input images that go on to be used for training the model.

Document Segmentation

Step 530 of FIG. 5, document segmentation, is designed to distinguish the document portion of the input image 600 (i.e. the portion consisting of the official document 400) from the remaining portion of the input image 600 (i.e. the portion not consisting of the official document 100). This is achieved by performing image segmentation on the input image 600 to form a binary input image 601 that distinguishes the document portion from the remaining portion of the input image (step 532 of FIG. 8). Put another way, image segmentation determines which pixels of input image 600 belong to the official document 400 and which do not.

Image segmentation is performed using an image segmentation model. One example model is based on DeeplabV3 deep learning architecture, described in Chen, L. C., Papandreou, G., Schroff, F., & Adam, H. (2017). Rethinking atrous convolution for semantic image segmentation. arXiv preprint arXiv:1706.05587. Of course, other models can be used for solving the segmentation task. The image segmentation model is trained by using typically a thousand samples of official documents 400 across different document types.

Figure 8:
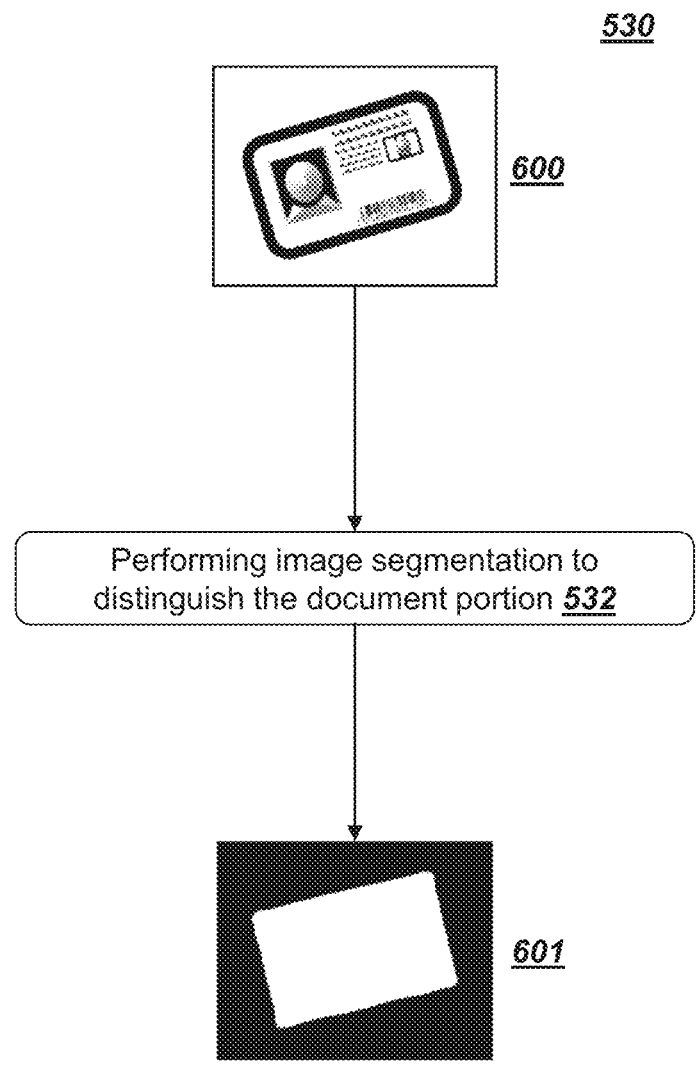
FIG. 8 is a flow diagram of a method of document segmenting according to the present invention.

By providing the input image 600 to the image segmentation model as an input, the model produces a binary input image 601 that is a binary segmentation mask which defines the pixels of the image belonging to the official document 400. More particularly, the binary segmentation mask is of the same size as the input image 600 and represents the document portion with a pixel value of 255 (i.e. true white) pixel value and the remaining portion with a pixel value of 0 (i.e. true black). An example of binary input image 601 and corresponding input image 600 is shown in FIG. 8.

Template Projection

Figure 9:
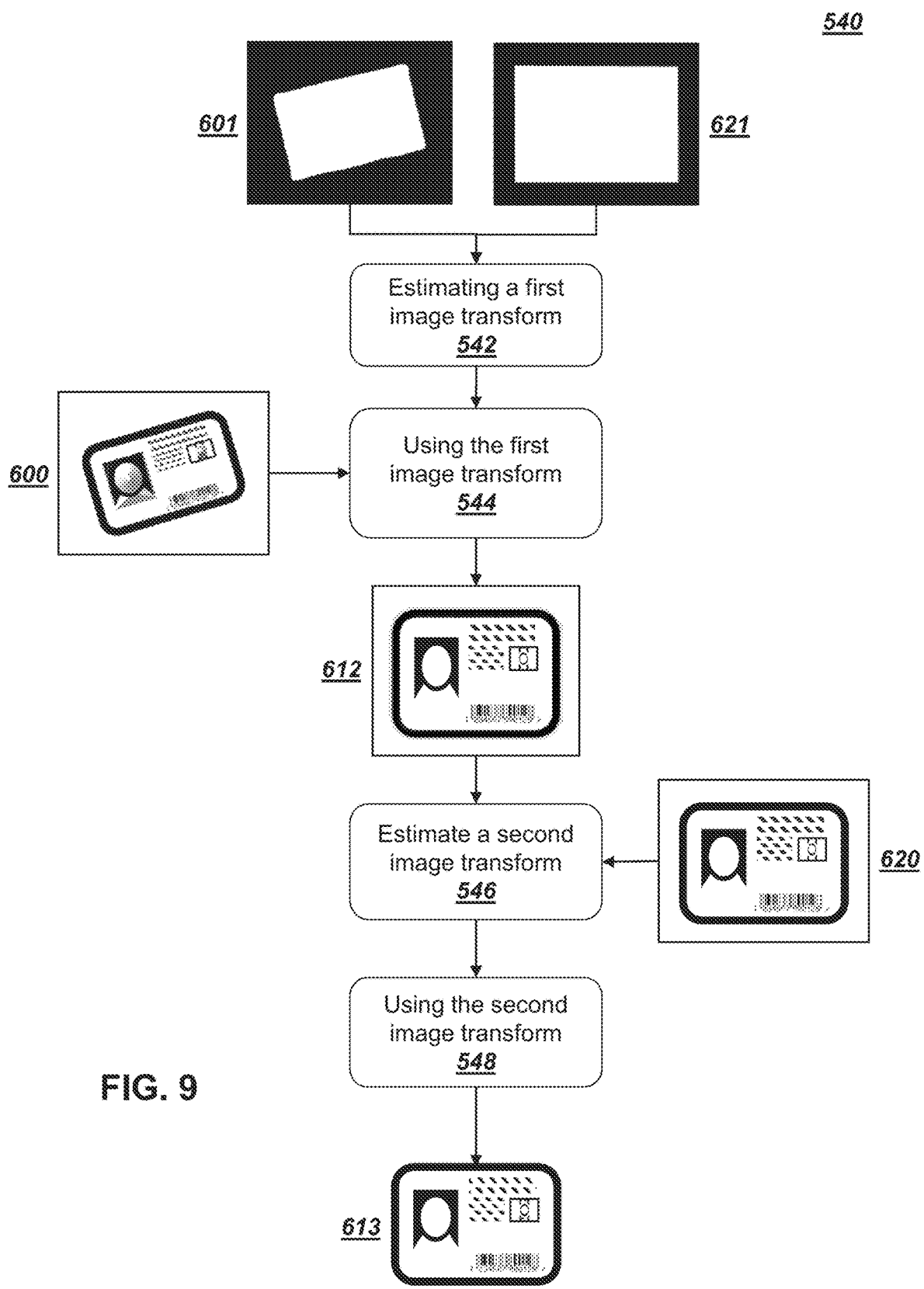
FIG. 9 is a flow diagram of a method of template image projecting according to the present invention.

FIG. 9 shows an example of the steps involved in template image projection step 540 from FIG. 5. As mentioned with respect to FIG. 5, template image projection is a multi-stage alignment process. Broadly speaking, a first image transform is estimated to align the binary input image 601 to a binary template image 621 and used on the input image 600 to form an intermediate image 612. Then, a second image transform is estimated to align the intermediate image 612 to the template image 620 and used on the intermediate image 612 to form an output image 613. As is evident from this multi-stage alignment processes, the concept of "alignment", as used herein, covers both full pixel-to-pixel alignment as well as more approximate degrees of alignment. Accordingly, when, for example, a first image transform is estimated to align the binary input image 601 to a binary template image 621, the result of using the first image transform may not be full pixel-to-pixel alignment, but a more approximate alignment. Nevertheless, as previously mentioned, the multi-stage alignment process of template image projection 540 has a high degree of accuracy, and thus achieves a high degree of alignment.

In further detail, with reference to FIG. 9, template image projection 540 requires four inputs. These inputs are: the input image 600 (or adjusted input image 600'); the binary input image 601; the template image 620 which contains an official document 400 of the same type as the input image 600; and the binary template image 621. The steps for generating and acquiring these images are described in the pre-processing, classification and document on-boarding sections. As previously discussed, the binary input image 601 is a binary segmentation mask of the same size (i.e. same number of pixels) as the input image 600 that represents the document portion with a pixel value of 255 (i.e. true white) and the remaining portion with a pixel value of 0 (i.e. true black). The same is also true for the template image 620 and the binary template image 621. Examples of the input image 600, binary input image 601, template image 620, and binary template image 621, are shown in FIG. 9.

At step 542, a first image transform is estimated using the binary input image 601 and the binary template image 621. The purpose of step 542 is to estimate the image transformation (mapping) that aligns the official document 400 in the input image 600 to the official document 400 in the template image 620. Estimating the first image transform involves two aspects. As a first aspect, a suitable geometric image transformation that corresponds to the mapping is selected. Then, as a second aspect, an objective function is defined that, when optimized, provides the optimum parameter estimates for the geometric image transformation (i.e. the extent to which the geometric image transformations are to be applied). An example geometric image transformation for use in step 542 is a global homography transformation. An example objective function for use in step 542 is a correlation coefficient-based 12 norm, as described in Evangelidis, G. D., & Psarakis, E. Z. (2008). Parametric image alignment using enhanced correlation coefficient maximization. IEEE Transactions on Pattern Analysis and Machine Intelligence, 30(10), 1858-1865. Of course, one skilled in the art would appreciates, there is a plethora of different geographic image transformations and objective function (both machine learning as well as deep learning-based) can be utilized for step 542. A further example is provided in Rocco, I., Arandjelovic, R., & Sivic, J. (2017). Convolutional neural network architecture for geometric matching. In Proceedings of the IEEE Conference on Computer Vision and Pattern Recognition (pp. 6148-6157).

The image transform may comprise a plurality of first image transforms, where each of the plurality of first image transforms is configured to align a different sub-frame of the binary input image to the binary template image. For example, the number of first image transforms may be up to 10. The sub-frames may be uniformly tiled, meaning that each sub-frame is the same size and shape. Alternatively, the sub-frames may be non-uniformly tiled, meaning that each sub-frame may have a different size and/or shape. For instance, smaller sub-frames may be used in and around the document portion, whilst larger sub-frames may be used in the remaining portion. Using a plurality of first image transforms increases the amount of noise that data extraction pipeline 500 can handle and compensate for.

At step 544, the first image transform is used on the input image 600 in order to form an image in which the official document 400 is approximately aligned with the official document 400 of the template image 620. The image which is formed is referred to herein as intermediate image 612. The official document 400 contained within intermediate image 612 has a particular degree of alignment with official document 400 contained within the template image 620. Before proceeding to step 546, the intermediate image 612 may undergo intermediate processing steps. In particular, the intermediate image 613 is cropped such that the document portion is a substantial part of, if not all of, the intermediate image 613. Cropping is performed using the coordinates of the template document portion within the template image 620. The coordinates represent the four corners of the template document portion, corresponding to the four corners of the official document 400 in the template image 620

(four corners because official document 400 is generally rectangular). The coordinates are predetermined, before the data extraction pipeline 500 is performed, either manually or otherwise. Using the coordinates from the template image 620 on the intermediate image is possible because the template document portion is almost the same (in shape, location, rotation) as the document portion of the intermediate image 612. The template image 620 is cropped using the coordinates such that the template document portion is a substantial part of, if not all of, the template image 620.

At step 546, a second image transform is estimated using the intermediate image 612 and the template image 620. The purpose of step 546 is to estimate the image transformation (mapping) that aligns the official document 400 in the intermediate image 612 to the official document 400 in the template image 620. Step 546 is performed using the same geometric image transform and objection function as selected for step 542, but using the intermediate image 612 and the template image 620. In one example, both the template image 620 and the intermediate image 612 are converted to greyscale, and gradient representations of the template image 620 and the intermediate image 612 are used in the selected geometric image transform and objective function.

The image transform may comprise a plurality of second image transforms, where each of the plurality of second image transforms is configured to align a different sub-frame of the intermediate image to the template image. For example, the number of second image transforms may be up to 10. The sub-frames may be uniformly tiled, meaning that each sub-frame is the same size and shape. Alternatively, the sub-frames may be non-uniformly tiled, meaning that each sub-frame may have a different size and/or shape. For instance, smaller sub-frames may be used in and around features in the document portion (e.g. text, an MZR, an image), whilst larger sub-frames may be elsewhere. Using a plurality of first second transforms increases the amount of noise that data extraction pipeline 500 can handle and compensate for. A plurality of second image transforms may be used in addition to, or as an alternative to, a plurality of first image transforms.

At step 548, the second image transform is used on the intermediate image 612 to form an output image 613. The output image 613 has a degree of alignment with the template image 620 which is higher than that of the intermediate image 612.

As will be appreciated from the description above, the steps of estimating the first image transform (step 542), performing image alignment on the input image 600 (step 544), estimating the second image transform (step 546), and performing image alignment on the intermediate image (step 548) do not use a deep learning-based model. This is advantageous because it means that template image projection 540 is performed without requiring training of a document type specific deep learning-based model, resulting in quick on-boarding of new document types which only require a single, authentic example of the document type for on-boarding.

Optionally, to improve processing time of template image projection step 540, the multi-stage alignment process may be performed using multiple scales. In particular, after using the first image transform in step 544 and prior to estimating the second image transform in step 546, the size of the intermediate image and the template image is resized using a resize operator. Then, after estimating the second image transform in step 546 and prior to using the second image transform in step 548, a transverse of the resize operator is applied to the second image transform.

Data Extraction Using Template Image

As mentioned with respect to FIG. 5, data extracting step 550 involves extracting a field 614 from the output image 613 using a predetermined field of the template image 620. In particular, the predetermined field of template image 620 has predetermined coordinates which are used with the output image 613 to extract a corresponding field from the output image 613. The predetermined coordinates denote the four corners of the field when field 614 is rectangular. Extracting the field 614 therefore involves extracting the pixels of output image 613 contained within the predetermined coordinates. Using the predetermined coordinates from the template image 620 in this way is possible because of the high degree of alignment between the template image 620 and the output image 613.

More than one field may be extracted from output image 613. In fact, any n number of fields 614 may be extracted from the output image 613. The number of fields 613 to be extracted depends on the number of predetermined fields marked in the template image 612. Moreover, depending on the document types, the predetermined fields can take the form of, for example, an image field 410, an MRC field 420, a text field 430, a secondary image field 440, and an MZR field 450. For instance, in a template image of a UK driving license, there may be several predetermined fields each corresponding a different piece of data of the person, for example their first name, last name, address, facial photograph, etc. An example of predetermined fields for a UK driving license is shown in template image 620 of FIG. 11. To assist with determining the significance of each of the predetermined fields in the template image 620, each of the predetermined fields is semantically labelled.

Figure 10:
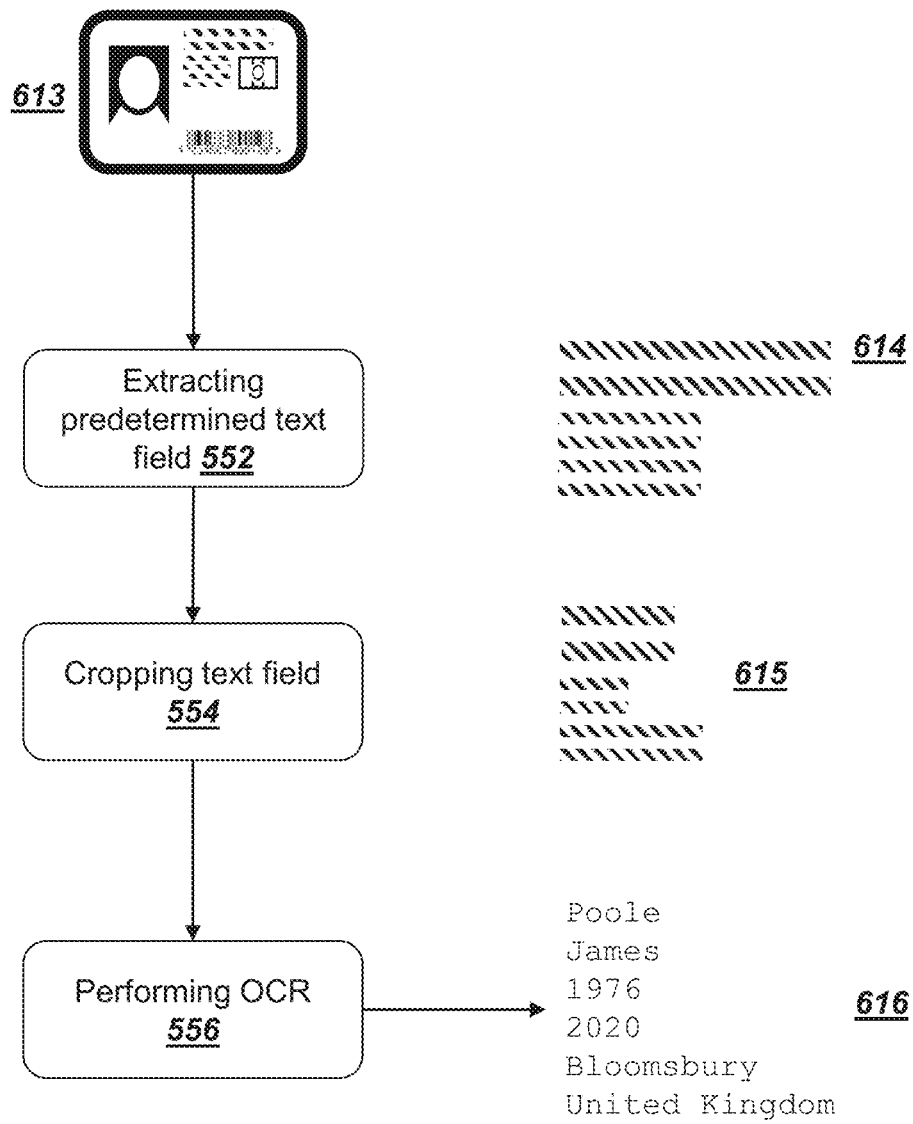
FIG. 10 is a flow diagram of a method of extracting information using the template image according to the present invention.

When the predetermined field is a text field, further processing of the extracted field 614 is performed in order to improve the accuracy and speed of subsequent data extraction processes. Data extracting step 550 for text fields, including this further processing, is shown in FIG. 10. In particular, in step 552, the pixels containing the one or more text fields 614 are extracted from output image 613 using one or more corresponding predetermined text fields from template image 620, as described above. FIG. 10 shows an example official document 400 that contains six text fields 614. After step 552, in step 554, each text field 614 is cropped so that the text field fits the text string contained therein. Typically, this involves reducing the width of the text field, as shown by cropped text fields 615 in FIG. 10. A field-box refiner may be used to perform step 554. Subsequently, optical character recognition (OCR) is performed on the cropped text field 615 to extract text 616 from the official document 400 contained within input image 600. For example, as shown in FIG. 10, the text fields "Poole, James, 1976, 2020, Bloomsbury, and United Kingdom" have been extracted. The significance of each of these text fields is determined using the semantic label of the corresponding predetermined field, which is output along with text 616.

OCR in step 556 is performed using a deep learning-based OCR model which is agnostic to the document type of official document 400 in input image 600. As a consequence, the OCR model is able to process any document type, including new, currently unknown document types. This means on-boarding a new document type is very quick, since the OCR model does not require further training for each new document type (although further training can nevertheless be performed).

The deep learning-based OCR model is agnostic to document type by virtue of the images used to train the model. These training images are generated by sampling a font family of a first random document type and then sampling a background image of a second random document type. Using these, a training image is generated which comprises a text string from the font family and the background image. The text string may either be random, or may use formatting from the corresponding text field of the first random document type. After this, the training image is distorted. This distortion may be performed by distorting the text string by using letter thickening or thinning. Alternatively, or additionally, distorting the training image may comprise using one or more random image transformations, wherein the one or more random image transformations comprise scale, rotation, translation, Gaussian noise, motion blur, brightness and glare, or inverting the colors. Then, an augmentation function is applied to the training image, and the subsequent training image is output.

Typically, OCR is performed in several steps including segmenting words into individual characters, extract specialized features, and classifying each character. Although this typical process is simple and generally accurate, it has multiple limitations when applied to input image 600, or any output image 613 derived therefrom, which results in sometimes poor extraction capabilities. To overcome these limitations, the deep learning-based OCR model used in step 556 does not segment words into individual characters. The deep learning-based OCR model comprises three parts: a convolutional neural network (CNN), a recurrent neural network (RNN), and a special loss function for learning from sequences called Connectionist Temporal Classification (CTC) loss. Using one or more probabilities generated by the deep learning-based OCR model, a confidence score can be assigned to the extracted data. This can be used to determine whether an error has occurred in any of the previous steps of data extraction pipeline 500, or if the quality of input image 600 is beyond that expected to yield a confident result.

When the predetermined field is a machine readable zone (MRZ), the pixels containing the MRZ in output image 613 is extracted as described above. Afterwards, OCR on the MRZ to extract machine readable information from the document. When the predetermined field is an image field, the pixels containing the image field is extracted. This extracted image field may then be used in other authentication processes, such as the process described in EP 3 588 364 A1.

Document On-Boarding

Data extraction pipeline 500 is capable of extracting data from a plurality of different document types. This means, for instance, that a single extraction pipeline 500 is able to extract data from all of a British passport, a Brazilian driving license, a Gibraltar driving license, an Idaho national identity card, etc. Accordingly, the data extraction pipeline 500 may be repeated with a second input image 600 having a second document type which is different from the first document type. All that is required is that the second document type has been "on-boarded" for use with the data extraction pipeline 500. This section provides further details on how a document type is on-boarded for use with data extraction pipeline 500.

As previously mentioned, advantages of using data extraction pipeline 500 is that new document types of official document 400 can be on-boarded quickly. This is because the on-boarding process is simple and does not require retraining of any of the deep learning-based models used in data extraction pipeline 500. Further, the on-boarding process requires only a single authentic example of said document type, which is a contrast from document type specific deep learning-based models where hundreds or thousands of examples would be necessary to ensure accuracy of the data extraction process.

On-boarding starts with a single image file of an official document 400 of the document type that is to be on-boarded. This image file may be captured by a camera or another method (e.g. a flatbed scanner). Preferably the method used to capture the image file results in a low amount of geometric distortions and perspective distortions, as this will make any data extraction pipeline more accurate for that document type. This image file is stored in a database in memory 334 as a template image 620 with a plurality of other template images, each template image being of a different document type. Optionally, the pre-processing method described in relation to FIG. 6 may be used on the image file before storage.

The predetermined fields of the document type to be on-boarded are determined manually by marking bounding boxes on the template image 620. Each bounding box corresponds to one of the predetermined fields. Predetermined coordinates corresponding to the four corners of the bounding box determined and stored in the database along with the template image 620. In addition, the bounding boxes are semantically labelled so that the content of said boxes can be output at the data extraction step. For example, a bounding box may be semantically labelled with first name, last name, date of birth, date of issue, date of expiry, document number, address, city, facial image, etc. The labels are stored along with the corresponding predetermined coordinates. The predetermined coordinates corresponding to the four corners of the official document 400 in the template image 620 are also determined and stored in the database.

When a particular template image 620 is required in data extraction pipeline 500, as indicated by the classification step, the particular template image 620 (including predetermined fields and labels) and binary template image 621 are retrieved from the database.

Example of Data Extraction Pipeline

FIG. 11 shows data extraction pipeline 500 being performed on an example official document 400.

The input image 600, which has been received from a camera 253 of a mobile phone has been pre-processed according to the method described in relation to FIG. 6 and is stored in a first database of memory 334 of server 301. The official document in this example in input image 600 is a UK drivers license, which has been classified using the classification method described in relation to FIG. 7. The input image 600 is used to form a binary input image 601 using the document segmentation step described in relation to FIG. 8. The binary input image 601 is also stored in the first database in memory 334 of server 301.

A second database in memory 334 contains a template image 620 of a UK drivers license. As shown in FIG. 11, the template image 620 has several predetermined fields, including a plurality of text fields (first name, family name, date of birth, date of issue, date of expiry, document number, address, city) and an image field (facial photograph). The second database of memory 334 also contains a binary template image 621 of the template image 620 which has been formed using the document on-boarding process described herein.

The binary input image 601, binary template image 621 and input image 600 are used in the template image projection method described in relation to FIG. 9, to yield intermediate image 612. As can be seen from FIG. 11, the official document 400 occupies approximately the same portion of the intermediate image 612 as the template image 620 (i.e. the document portion and the template document portion are approximately equal). Then, the intermediate image 613 and the template image 620 are used in the template image projection method described in relation to FIG. 9 to yield output image 612.

Using the predetermined fields of template image 620, text fields 614 and an image field containing a facial image are extracted according to the process described in FIG. 10. The text fields 614 are then cropped to form cropped text fields, and OCR is performed on the cropped text fields in order to derive the text 616. Both text 616 and the image field may be used for authenticating the official document 400 in the input image 600. Methods for authenticating which use the text and image fields are beyond the scope of this description, however.

Experimental Comparison of Data Extraction Pipelines

Figure 1A:
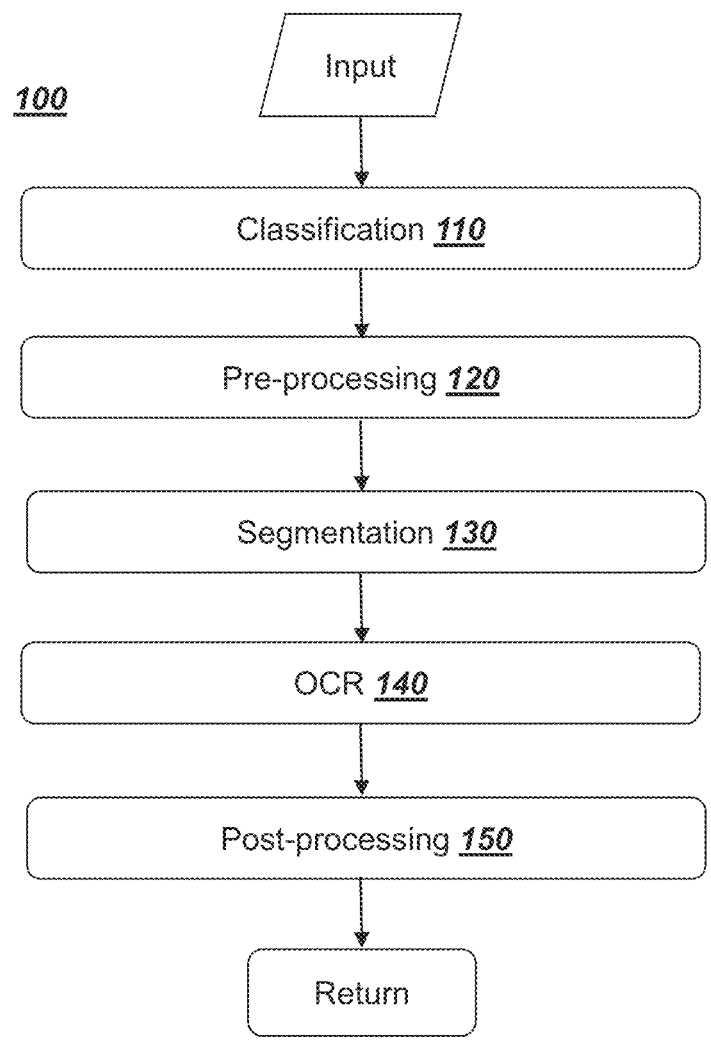
FIG. 1A presents a flow diagram of a known data extraction pipeline.
Figure 1B:
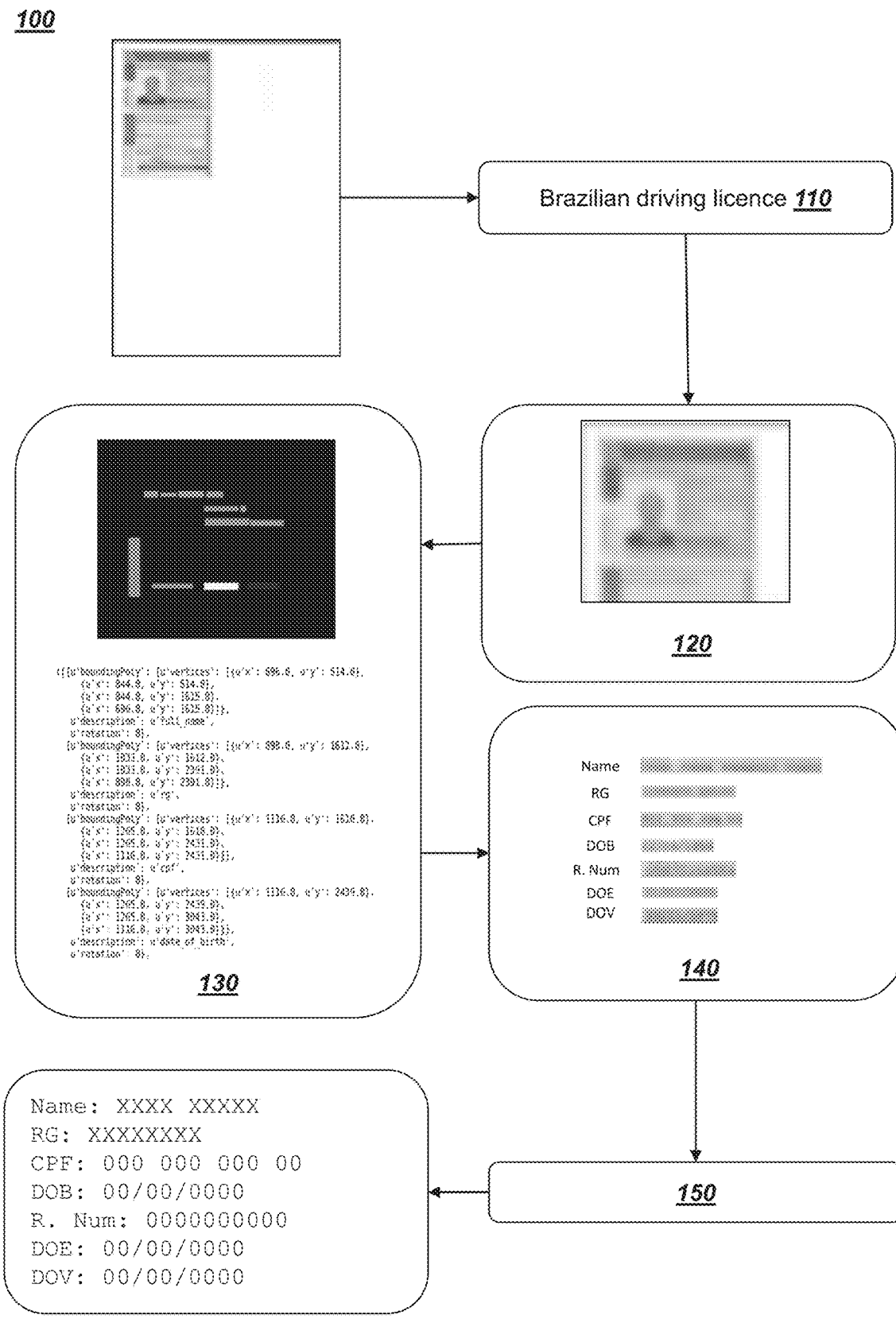
FIG. 1B presents an example document processed using the known data extraction pipeline.
Figure 12:
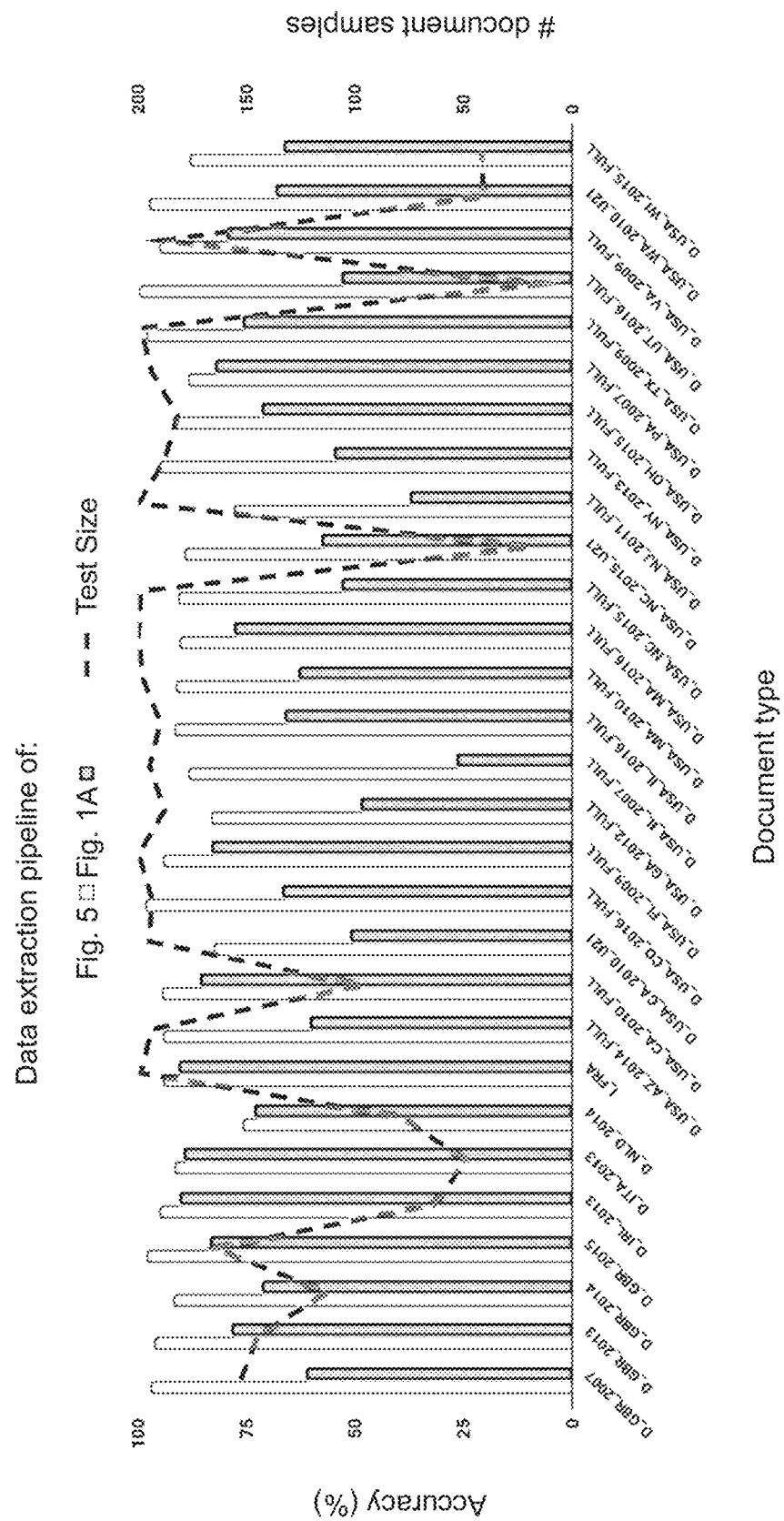
FIG. 12 presents a graph showing the accuracy of the known data extraction pipeline of FIG. 1A and the data extraction pipeline according to the present invention.

As mentioned, by using a data extraction pipeline on an official document 400 it can be determined whether the official document 400 is authentic or not. FIG. 12 shows an experimental comparison of the data extraction pipeline 500 of FIG. 5 against the prior art data extraction pipeline 100 of FIG. 1A in which the data extracted by each of these respective pipelines has been used to predict the authenticity of the official document 400 from which the data originated. The vertical axis shows how accurate the predictions were, whilst the horizontal axis shows different document types. As can be appreciated from FIG. 12, the accuracy of the data extraction pipeline 500 of FIG. 5 is improved compared to that of data extraction pipeline 100 of FIG. 1A for all document types. Significantly, for document types where data extraction pipeline 100 has low accuracy, which are typically document types for which there is limited examples available for training the document type specific deep learning-based models in data extraction pipeline 100 of FIG. 1A, the data extraction pipeline 500 of FIG. 5 is shown to have significantly improved accuracy. This is because data extraction pipeline 500 is agnostic to the document type, and is not dependent on large amounts of training data of a particular document type. Overall, the accuracy of the data extraction pipeline 500 is fairly consistent, around 95%. Reduced accuracy was found to occur due to problems with the input image 600 containing the official document 400, including poor lighting conditions.

General

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention can take the form of an entirely hardware embodiment, an entirely software embodiment or an embodiment containing both hardware and software elements. Hardware elements may be physical hardware elements or virtual hardware elements. In a preferred embodiment, the invention is implemented in software.

Furthermore, the invention can take the form of a computer program embodied as a computer-readable medium having computer executable code for use by or in connection with a computer. For the purposes of this description, a computer readable medium is any tangible apparatus that can contain, store, communicate, propagate, or transport the program for use by or in connection with the computer. Moreover, a computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The flow diagrams in the drawings illustrate the architecture, functionality, and operation of possible implementations of methods according to various embodiments of the present invention. In this regard, each block in the flow diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the flow diagrams, and combinations of blocks in the flow diagrams, can be implemented by special purpose hardware-based systems that perform the specified functions or acts, or combinations of special purpose hardware and computer instructions.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

Embodiments

The following list provides embodiments of the invention and forms part of the description. These embodiments can be combined in any compatible combination beyond those expressly stated. The embodiments can also be combined with any compatible features described herein:

Embodiment 1: A computer-implemented method for extracting data from a document comprising: acquiring an input image comprising a document portion, the document portion being of a document of a first document type; performing image segmentation on the input image to form a binary input image that distinguishes the document portion from the remaining portion of the input image; estimating a first image transform to align the binary input image to a binary template image; using the first image transform on the input image to form an intermediate image; estimating a second image transform to align the intermediate image to a template image, the template image comprising a template document portion, the template document portion being of a different document of the first document type; using the second image transform on the intermediate image to form an output image; and extracting a field from the output image using a predetermined field of the template image.

Embodiment 2: The method of embodiment 1, wherein the template document portion has predetermined coordinates in the template image.

Embodiment 3: The method of embodiment 2, further comprising, after using the first image transform and prior to estimating a second image transform, cropping the intermediate image using the predetermined coordinates.

Embodiment 4: The method of embodiment 3, further comprising cropping the template image using the predetermined coordinates.

Embodiment 5: The method of any preceding embodiment, further comprising, after using the first image transform and prior to estimating the second image transform, reducing the size of the intermediate image and the template image using a resize operator.

Embodiment 6: The method of embodiment 5, further comprising, after estimating the second image transform and prior to using the second image transform, applying a transverse of the resize operator to the second image transform.

Embodiment 7: The method of any preceding embodiment, wherein the binary template image is a binary segmentation mask of the same size as the template image that represents the template document portion with a pixel value of 255 and the remaining portion with a pixel value of 0.

Embodiment 8: The method of any preceding embodiment, wherein estimating a first image transform, using the first image transform, estimating a second image transform, and using the second image transform do not use a deep learning-based model.

Embodiment 9: The method of any preceding embodiment, wherein acquiring the input image comprises receiving an image file.

Embodiment 10: The method of embodiment 9, wherein the image file is captured by a camera of a mobile electronic device.

Embodiment 11: The method of embodiment 10, wherein the mobile electronic device is a digital camera, a tablet, a laptop, or a mobile phone.

Embodiment 12: The method of any preceding embodiment, further comprising, prior to image segmentation of the input image, pre-processing the input image.

Embodiment 13: The method of embodiment 12, wherein pre-processing comprises determining document location within the input image.

Embodiment 14: The method of embodiment 13, wherein determining document location comprises determining a bounding box around the document portion.

Embodiment 15: The method of embodiment 14, further comprising cropping the input image using the bounding box.

Embodiment 16: The method of embodiment 14 or 15, further comprises determining a confidence score for the bounding box.

Embodiment 17: The method of any of embodiments 12 to 16, wherein pre-processing comprises estimating the pose of the document within the input image.

Embodiment 18: The method of embodiment 17, wherein pre-processing further comprises rotating the input image using the pose.

Embodiment 19: The method of any preceding embodiment, wherein the binary input image is a binary segmentation mask of the same size as the input image that represents the document portion with a pixel value of 255 and the remaining portion with a pixel value of 0.

Embodiment 20: The method of any preceding embodiment, further comprising extracting a second field from the output image using a second predetermined field of the template image.

Embodiment 21: The method of any preceding embodiment, further comprising extracting an nth field from the output image using an nth predetermined field of the template image.

Embodiment 22: The method of any preceding embodiment, wherein the predetermined field has predetermined coordinates within the template image.

Embodiment 23: The method of embodiment 22, wherein extracting the field from the output image comprises using the predetermined coordinates.

Embodiment 24: The method of embodiment 23, wherein the predetermined coordinates are semantically labelled.

Embodiment 25: The method of any preceding embodiment, wherein the field is a text field.

Embodiment 26: The method of embodiment 25, further comprising cropping the extracted text field to fit the text within the text field.

Embodiment 27: The method of embodiment 26, wherein cropping is performed using a field-box refiner.

Embodiment 28: The method of any of embodiments 25-27, further comprising performing optical character recognition (OCR) on the text field to extract text from the document.

Embodiment 29: The method of any of embodiments 25-28, wherein the text field is one of a name, a date, an address, and an identification number.

Embodiment 30: The method of any preceding embodiment, wherein the field is a machine readable zone (MRZ) field.

Embodiment 31: The method of embodiment 30, further comprising performing OCR on the MRZ to extract machine readable data from the document.

Embodiment 32: The method of embodiment 30 or 31, wherein the MRZ is one of a barcode, a Quick Response (QR) code, a standardized passport MRZ.

Embodiment 33: The method of embodiment 28 or 32, wherein the OCR is performed using a deep learning-based OCR model.

Embodiment 34: The method of embodiment 33, further comprising training the deep learning-based OCR model.

Embodiment 35: The method of embodiment 34, further comprising generating a training image for training the deep learning-based OCR model.

Embodiment 36: The method of embodiment 35, wherein generating a training image comprises: sampling a font family of a first random document type; sampling a background image of a second random document type; generating a training image comprising a text string from the font family and the background image; distorting the training image; applying an augmentation function to the training image; and outputting the training image.

Embodiment 37: The method of embodiment 36, wherein the text string is random.

Embodiment 38: The method of embodiment 36, wherein the text string uses formatting of the text field.

Embodiment 39: The method of any of embodiments 36-38, wherein distorting training image comprises distorting the text string comprises using letter thickening or thinning.

Embodiment 40: The method of any of embodiments 36-39, wherein distorting the image comprises using one or more random image transformations, wherein the one or more random image transformations comprise scale, rotation, translation, Gaussian noise, motion blur, brightness and glare.

Embodiment 41: The method of any of embodiments 36-40, wherein distorting the image comprises inverting the colors.

Embodiment 42: The method of any of embodiment 33-41, further comprising assigning a confidence score to the extracted data using one or more probabilities generated by the deep learning-based OCR model.

Embodiment 43: The method of any preceding embodiment, wherein the field is an image field.

Embodiment 44: The method of embodiment 43, wherein the image field is one of a primary facial image, a secondary facial image, and a security feature.

Embodiment 45: The method of any preceding embodiment, further comprising, prior to image segmentation of the input image, classifying the document of the input image as the first document type.

Embodiment 46: The method of embodiment 45, wherein classifying further comprises retrieving the template image and the binary template image of the first document type from a database.

Embodiment 47: The method of embodiment 46, wherein the database stores a plurality of template images, each template image being of a different document type.

Embodiment 48: The method of embodiment 46 or 47, wherein retrieving the template image comprises retrieving the predetermined field and a label.

Embodiment 49: The method of any of embodiments 46-48, wherein the database stores a plurality of binary template images, each binary template image corresponding to a different template image, each template image being of a different document type.

Embodiment 50: The method of any preceding embodiment, further comprising, prior to performing the preprocessing, on-boarding the first document type.

Embodiment 51: The method of embodiment 50, wherein on-boarding comprises storing the template image of the first document type in a database.

Embodiment 52: The method of embodiment 50 or 51, wherein on-boarding comprises forming the binary template image by performing image segmentation on the template image and storing the binary template image in the database.

Embodiment 53: The method of any of embodiments 50 to 52, wherein on-boarding comprises forming the predetermined field using a bounding box on the template image.

Embodiment 54: The method of embodiment 53, further comprising semantically labelling the predetermined field to indicate the content of the corresponding field extracted from the output image.

Embodiment 55: The method of embodiment 54, further comprising storing the coordinates of the bounding box and the label in the database.

Embodiment 56: The method of any preceding embodiment, further comprising: acquiring a second input image comprising a document portion, the document portion being of a document of a second document type; performing image segmentation on the second input image to form a second binary input image that distinguishes the document portion from the remaining portion of the second input image; estimating a third image transform to align the second binary input image to a second binary template image, using the third image transform on the second input image to form a second intermediate image; estimating a fourth image transform to align the second intermediate image to a second template image, the second template image comprising a template document portion, the template document portion being of a different document of the second document type; using the second image transform on the second intermediate image to form a second output image; and extracting a field from the second output image using a predetermined field of the second template image.

Embodiment 57: The method of embodiment 56, further comprising forming the second binary template image by performing image segmentation on the second template image.

Embodiment 58: The method of any preceding embodiment, wherein the first image transform comprises a plurality of first image transforms, each of the plurality of first image transforms configured to align a different sub-frame of the binary input image to the binary template image.

Embodiment 59: The method of any preceding embodiment, wherein the second image transform comprises a plurality of second image transforms, each of the plurality of second image transforms configured to align a different sub-frame of the intermediate input image to the template image.

Embodiment 60: The method of embodiment 58 or 59, wherein the sub-frames are uniformly tiled.

Embodiment 61: The method of embodiment 58 or 59, wherein the sub-frames are non-uniformly tiled.

Embodiment 62: A computer-readable medium comprising executable instructions for performing the method of any one of preceding embodiments.

Embodiment 63: A server comprising a processor configured to execute executable code stored in memory, wherein the executable code comprises instructions for performing the method of any one of preceding embodiments.

What is claimed is:

1. A computer-implemented method for extracting data from a document comprising:
    acquiring an input image comprising a document portion, the document portion being of a document of a first document type;
    performing image segmentation on the input image to form a binary input image that distinguishes the document portion from the remaining portion of the input image;
    estimating a first image transform to align the binary input image to a binary template image;
    using the first image transform on the input image to form an intermediate image;
    estimating a second image transform to align the intermediate image to a template image, the template image comprising a template document portion, the template document portion being of a different document of the first document type;
    using the second image transform on the intermediate image to form an output image; and
    extracting a field from the output image using a predetermined field of the template image.

2. The method of claim 1, wherein estimating the first image transform, using the first image transform, estimating the second image transform, and using the second image transform do not use a deep learning-based model.

3. The method of claim 1, wherein the template document portion has predetermined coordinates in the template image, the method further comprising:
after using the first image transform and prior to estimating the second image transform, cropping the intermediate image using the predetermined coordinates; and
cropping the template image using the predetermined coordinates.

4. The method of claim 1, further comprising:
after using the first image transform and prior to estimating the second image transform, reducing the size of the intermediate image and the template image using a resize operator; and
after estimating the second image transform and prior to using the second image transform, applying a transverse of the resize operator to the second image transform.

5. The method of claim 1, wherein the binary input image is a binary segmentation mask of the same size as the input image that represents the document portion with a pixel value of 255 and the remaining portion with a pixel value of 0, and the binary template image is a binary segmentation mask of the same size as the template image that represents the template document portion with a pixel value of 255 and the remaining portion with a pixel value of 0.

6. The method of claim 1, wherein the predetermined field has predetermined coordinates within the template image, and extracting the field comprises using the predetermined coordinates.

7. The method of claim 1, wherein the field is a text field, the method further comprising cropping the text field so that the text field fits the text contained therein and performing optical character recognition on the text field to extract text from the document.

8. The method of claim 7, wherein the optical character recognition (OCR) is performed using a deep learning-based OCR model, the method further comprising generating training images to train the deep learning-based OCR model.

9. The method of claim 1, wherein the first image transform comprises a plurality of first image transforms, each of the plurality of first image transforms configured to align a different sub-frame of the binary input image to the binary template image.

10. The method of claim 1, wherein the second image transform comprises a plurality of second image transforms, each of the plurality of second image transforms configured to align a different sub-frame of the intermediate input image to the template image.

11. The method of claim 1, further comprising, prior to performing image segmentation, pre-processing the input image by determining document location within the input image and estimating the pose of the document within the input image.

12. The method of claim 1, further comprising, prior to performing image segmentation, classifying the document of the input image as the first document type, and retrieving the template image and the binary template image of the first document type from a database.

13. The method of claim 1, further comprising:
acquiring a second input image comprising a document portion, the document portion being of a document of a second document type;
performing image segmentation on the second input image to form a second binary input image that distinguishes the document portion from the remaining portion of the second input image;
estimating a third image transform to align the second binary input image to a second binary template image,
using the third image transform on the second input image to form a second intermediate image;
estimating a fourth image transform to align the second intermediate image to a second template image, the second template image comprising a template document portion, the template document portion being of a different document of the second document type;
using the second image transform on the second intermediate image to form a second output image; and
extracting a field from the second output image using a predetermined field of the second template image.

14. A non-transitory computer-readable medium comprising a plurality of instructions that, when executed by a processor, cause the processor to:
acquire an input image comprising a document portion, the document portion being of a document of a first document type;
perform image segmentation on the input image to form a binary input image that distinguishes the document portion from the remaining portion of the input image;
estimate a first image transform to align the binary input image to a binary template image;
use the first image transform on the input image to form an intermediate image;
estimate a second image transform to align the intermediate image to a template image, the template image comprising a template document portion, the template document portion being of a different document of the first document type;
use the second image transform on the intermediate image to form an output image; and
extract a field from the output image using a predetermined field of the template image.

15. A server comprising a processor configured to execute executable code stored in a computer-readable memory, wherein the executable code comprises instructions that cause the processor to:
acquire an input image comprising a document portion, the document portion being of a document of a first document type;
perform image segmentation on the input image to form a binary input image that distinguishes the document portion from the remaining portion of the input image;
estimate a first image transform to align the binary input image to a binary template image;
use the first image transform on the input image to form an intermediate image;
estimate a second image transform to align the intermediate image to a template image, the template image comprising a template document portion, the template document portion being of a different document of the first document type;
use the second image transform on the intermediate image to form an output image; and
extract a field from the output image using a predetermined field of the template image.

* * * * *